US011835453B2

(12) United States Patent
Cavalli et al.

(10) Patent No.: US 11,835,453 B2
(45) Date of Patent: Dec. 5, 2023

(54) OPTICAL SENSOR DEVICE FOR FLUID SUBSTANCES HAVING A PROTECTION ARRANGEMENT FOR COMPENSATING INCREASE IN FLUID VOLUME OR PRESSURE

(71) Applicant: ELTEK S.p.A., Casale Monferrato (IT)

(72) Inventors: Fabio Cavalli, Casale Monferrato (IT); Mauro Zorzetto, Casale Monferrato (IT); Costanzo Gadini, Casale Monferrato (IT)

(73) Assignee: ELTEK S.p.A., Casale Monferrato (IT)

( * ) Notice: Subject to any disclaimer, the term of this patent is extended or adjusted under 35 U.S.C. 154(b) by 68 days.

(21) Appl. No.: 17/044,632

(22) PCT Filed: Apr. 3, 2019

(86) PCT No.: PCT/IB2019/052733
§ 371 (c)(1),
(2) Date: Oct. 1, 2020

(87) PCT Pub. No.: WO2019/193517
PCT Pub. Date: Oct. 10, 2019

(65) Prior Publication Data
US 2021/0199574 A1    Jul. 1, 2021

(30) Foreign Application Priority Data

Apr. 5, 2018 (IT) .................. 102018000004247

(51) Int. Cl.
*G01N 21/43* (2006.01)
(52) U.S. Cl.
CPC ....... *G01N 21/43* (2013.01); *G01N 2201/022* (2013.01)

(58) Field of Classification Search
CPC ............. G01N 21/43; G01N 2201/022; G01N 2021/036; G01N 2021/0364; G01N 21/552; G01N 21/05; G01N 21/0317
See application file for complete search history.

(56) References Cited

U.S. PATENT DOCUMENTS

| | | | |
|---|---|---|---|
| 5,703,366 | A | 12/1997 | Sting et al. |
| 5,773,825 | A | 6/1998 | Doyle |
| 2002/0018200 | A1 | 2/2002 | Salo |

FOREIGN PATENT DOCUMENTS

| | | |
|---|---|---|
| JP | H02-98654 | 4/1990 |
| JP | 2014-102217 | 6/2014 |

OTHER PUBLICATIONS

International Search Report for PCT/IB2019/052733 dated May 29, 2019, 4 pages.
(Continued)

*Primary Examiner* — Hwa Andrew Lee
(74) *Attorney, Agent, or Firm* — Nixon & Vanderhye P.C.

(57) ABSTRACT

An optical sensor device (1) for a fluid substance (LS) comprises a device body (2) having a detection portion (14), associated to which is a sensitive optical part that comprises at least one of an emitter (20) and a receiver (21) of an optical radiation ($R_e$, $R_r$). The detection portion (14) is made of a material transparent to the optical radiation ($R_e$, $R_r$) and has an inner surface (23a, 23b) and an outer surface (15), the outer surface (15) being designed to be in contact with the fluid substance (LS) and the inner surface (23a, 23b) being designed to be isolated from the fluid substance. The at least one of the emitter (20) and the receiver (21) of the sensitive optical part is optically coupled to the inner surface (23a, 23b) of the detection portion (14), in such a way that the optical radiation ($R_e$, $R_r$) is at least in part propagated through the detection portion (14), in particular with an angle and/or an intensity that is variable as a function of a
(Continued)

characteristic of the fluid substance. The optical sensor device (1) comprises a protection arrangement, configured for preventing possible deformation of the detection portion (14) caused by an increase in volume of the fluid substance (LS), in particular deformation of at least one of its inner surface (23a, 23b) and its outer surface (15). The protection arrangement comprises at least one compensation element (13) having an elastically deformable body, which is able to contract, for compensating thereby a possible increase in volume of the fluid substance (LS) or else for enabling a reversible displacement of the detection portion (14) following upon a possible increase in volume of the fluid substance (LS).

12 Claims, 21 Drawing Sheets

(56) References Cited

OTHER PUBLICATIONS

Written Opinion of the ISA for PCT/IB2019/052733 dated May 29, 2019, 14 pages.

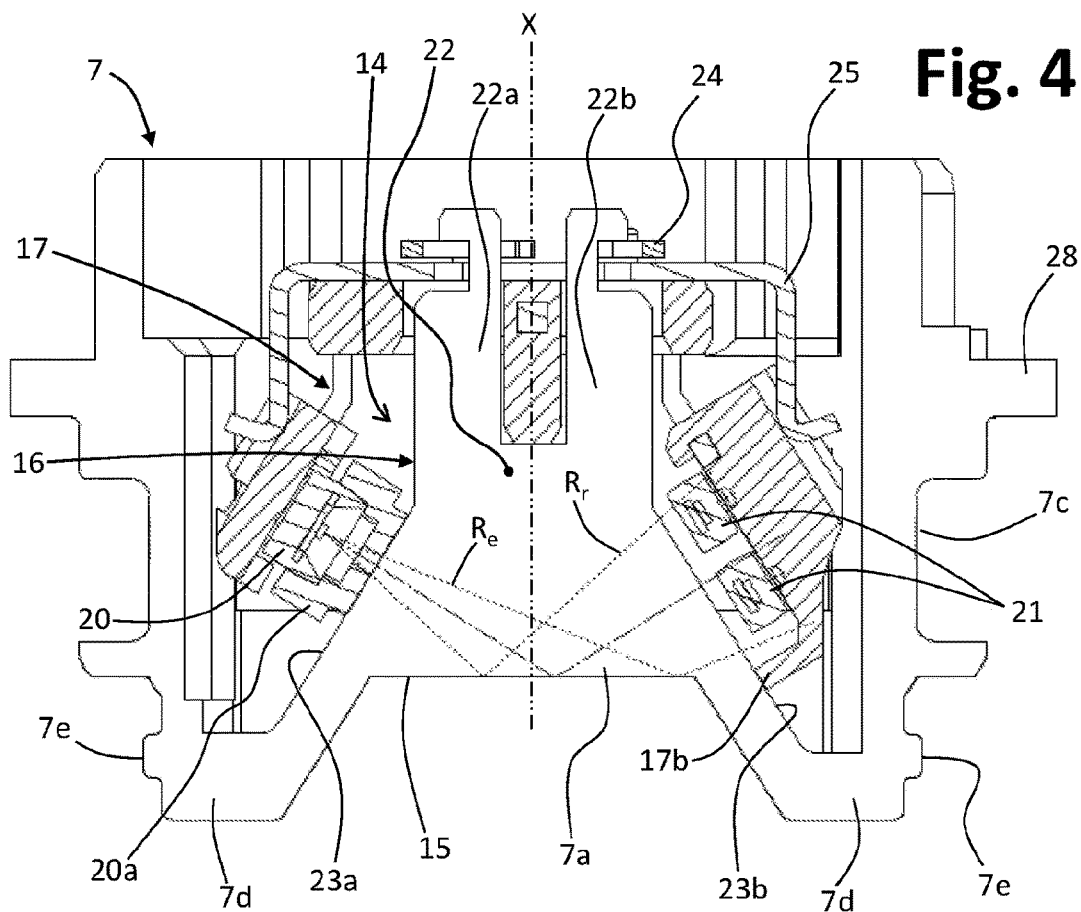
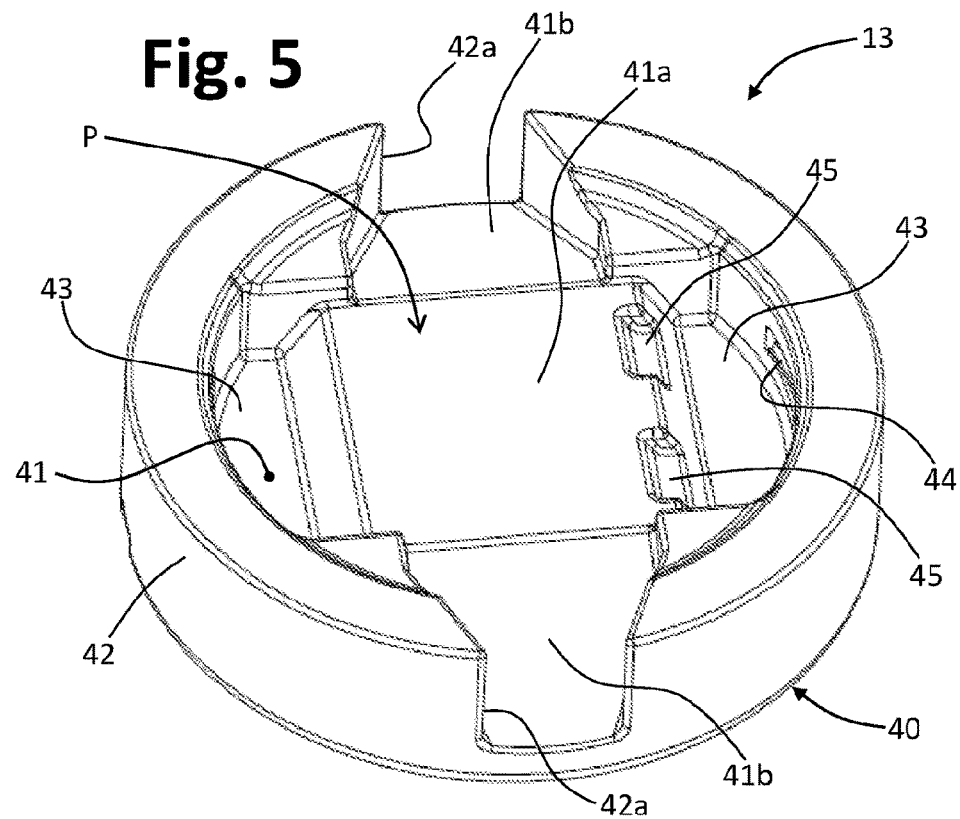

OPTICAL SENSOR DEVICE FOR FLUID SUBSTANCES HAVING A PROTECTION ARRANGEMENT FOR COMPENSATING INCREASE IN FLUID VOLUME OR PRESSURE

This application is the U.S. national phase of International Application No. PCT/IB2019/052733 filed Apr. 3, 2019 which designated the U.S. and claims priority to IT Patent Application No. 102018000004247 filed Apr. 5, 2018, the entire contents of each of which are hereby incorporated by reference.

FIELD OF THE INVENTION

The present invention relates to sensor devices of an optical type, used for detecting one or more characteristics of a fluid substance that is present in a generic container or duct, preferably of a vehicle. The invention finds preferred application in the field of optical sensors for detection of a qualitative type, for example for detecting the concentration of a liquid solution or for detecting the presence of possible impurities in a liquid substance.

PRIOR ART

For the purposes of control of fluid substances that are contained in generic containers or that flow in generic ducts it is common to use sensors for detecting characteristics such as the level, temperature, and quality. A typical example is represented by tanks or ducts belonging to exhaust-gas emission systems of some types of motor vehicles, conceived for the purposes of reduction of release of nitrogen oxides ($NO_x$) into the atmosphere.

A system that is particularly widespread for this purpose is based upon the process known as SCR (Selective Catalytic Reduction), which enables reduction of the nitrogen oxides of the gases by means of injection of a reducing liquid substance into the exhaust line. These treatment systems presuppose that the reducing agent is dosed and injected into the exhaust-gas flow in order to convert nitrogen oxide into nitrogen ($N_2$) and water ($H_2O$). The reducing substance is typically constituted by a solution of water and urea.

Proper operation of these systems is based, inter alia, upon the qualitative characteristics of the reducing substance, whereby are meant characteristics linked to its composition. For this purpose, sensor devices of various types have been proposed, amongst which of particular interest—for the purposes of the present invention—are the devices of an electro-optical or opto-electronic type, which include in general at least one emitter and at least one receiver of light radiation.

In general, in such sensor devices, the emitter directs the radiation through a prism or similar optical body, having a surface in contact with the fluid substance. At the interface with the fluid substance, a part of the radiation is refracted into the substance, and a part is reflected, where the latter part is detected by the receiver. The reflected part of radiation is considered directly proportional to the refractive index of the fluid substance, which makes it possible to determine whether the substance in question is water or a solution of urea, and to determine the concentration of this solution.

In certain applications, the devices of the type referred to operate in conditions of very low temperature: consider, for example, the case of a motor vehicle that remains exposed to temperatures lower than 0° C. It may hence occasionally happen that the fluid substance being measured freezes, thus increasing in volume. Freezing of the fluid substance does not in general entail particular risks of failure of the device both because its mechanical structure is in general strong and because its sensitive optical part, i.e., the emitter and the receiver, is in any case in a position isolated from the substance.

The present Applicant has, however, found that the increase in volume due to freezing of the fluid substance may occasionally lead to permanent deformation or displacement or failure of the surfaces of the optical prism, and in particular of its surface at the solid-fluid interface, or of one of the surfaces where the radiation enters the prism or exits therefrom, in particular when the prism or the body part of the device that integrates it is made of a plastic material or a brittle material. Similar problems may arise in the case of excessive increase in the pressure of the substance.

Even minimal variations of the position or geometrical configuration of one or more of the aforesaid surfaces may give rise to variations of the angle of reflection of the light radiation: this may be the source of significant errors of detection, in particular when the detection of the characteristic of interest of the fluid substance is based upon the principle of the critical angle of total reflection, according to which the optical radiation of interest can be reflected with an angle that is variable as a function of the characteristic of interest.

Problems of the sort referred to arise also in sectors different from that of exhaust-gas treatment systems, where an optical sensor is used for detecting characteristics of a fluid substance subject to possible increases in volume or over-pressures.

OBJECT AND SUMMARY OF THE INVENTION

In its general terms, the present invention aims at overcoming at least the aforesaid drawback, in a way that is simple and economically advantageous, but at the same time efficient and reliable in the long term. In this context, an aim of the invention is to provide a sensor device of an optical type designed to function properly and/or not to be subject to damage even in conditions of high stresses exerted by a substance being detected on parts of the sensor itself, for example due to increases in volume of the substance or to jumps in its pressure.

The above and other aims still, which will emerge more clearly hereinafter, are achieved, according to the present invention, by an optical sensor device having the characteristics referred to in the annexed claims. The claims form an integral part of the technical teaching provided herein in relation to the invention.

BRIEF DESCRIPTION OF THE DRAWINGS

Further aims, characteristics, and advantages of the present invention will emerge clearly from the ensuing detailed description, provided with reference to the annexed schematic drawings, which are provided purely by way of non-limiting example and in which:

FIG. 4 is a schematic cross-sectional view of a part of a sensor device according to possible embodiments of the invention, which integrates an optical detection arrangement;

FIGS. 5 and 6 are schematic perspective views of a compensation element, which can be used in a sensor device according to possible embodiments of the invention;

DESCRIPTION OF PREFERRED EMBODIMENTS OF THE INVENTION

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment", "in one embodiment", "in various embodiments", and the like that may be present in various points of this description do not necessarily refer to one and the same embodiment. Moreover, particular conformations, structures, or characteristics defined in the framework of this description may be combined in any adequate way in one or more embodiments, even different from the ones represented. The reference numbers and spatial references (such as "upper", "lower", "top", "bottom", etc.) are used herein merely for convenience and hence do not define the sphere of protection or the scope of the embodiments. It is moreover pointed out that, in the present description and in the attached claims, the adjective "outer", when referring to a surface of at least part of a portion of the device described herein, is intended to designate a surface that is to face the inside of a generic container or duct, i.e., a surface in contact with the fluid substance that is being detected, whereas the adjective "inner" is meant to designate an opposite surface of said wall, i.e., a surface that is to be located on the outside of the container or duct (for example, in which a circuit or an electrical, or electronic, or opto-electronic component is at least partially located), and in any case is not in contact with the substance. It is likewise pointed out that, in the present description and in the attached claims, by the term "optical radiation" is meant that part of the electromagnetic spectrum that comprises radiation with a wavelength of between 100 nm and 1 mm, including ultraviolet radiation (100-400 nm), visible radiation (380-780 nm), and infrared radiation (780 nm to 1 mm). Moreover comprised within the scope of the invention are to be understood both sources of optical radiation of a coherent or laser type and sources of optical radiation of a non-coherent type. In addition, where not otherwise specified or evident from the context described, the term "material", for example when referred to the body of an element described, and except where otherwise specified, is to be understood as indifferently indicating a single material (e.g., a plastic material) or a composition of a number of materials (e.g., a composite material or a mixture of materials).

In the figures, the same reference numbers are used to designate elements that are similar or technically equivalent to one another.

Figure 1:
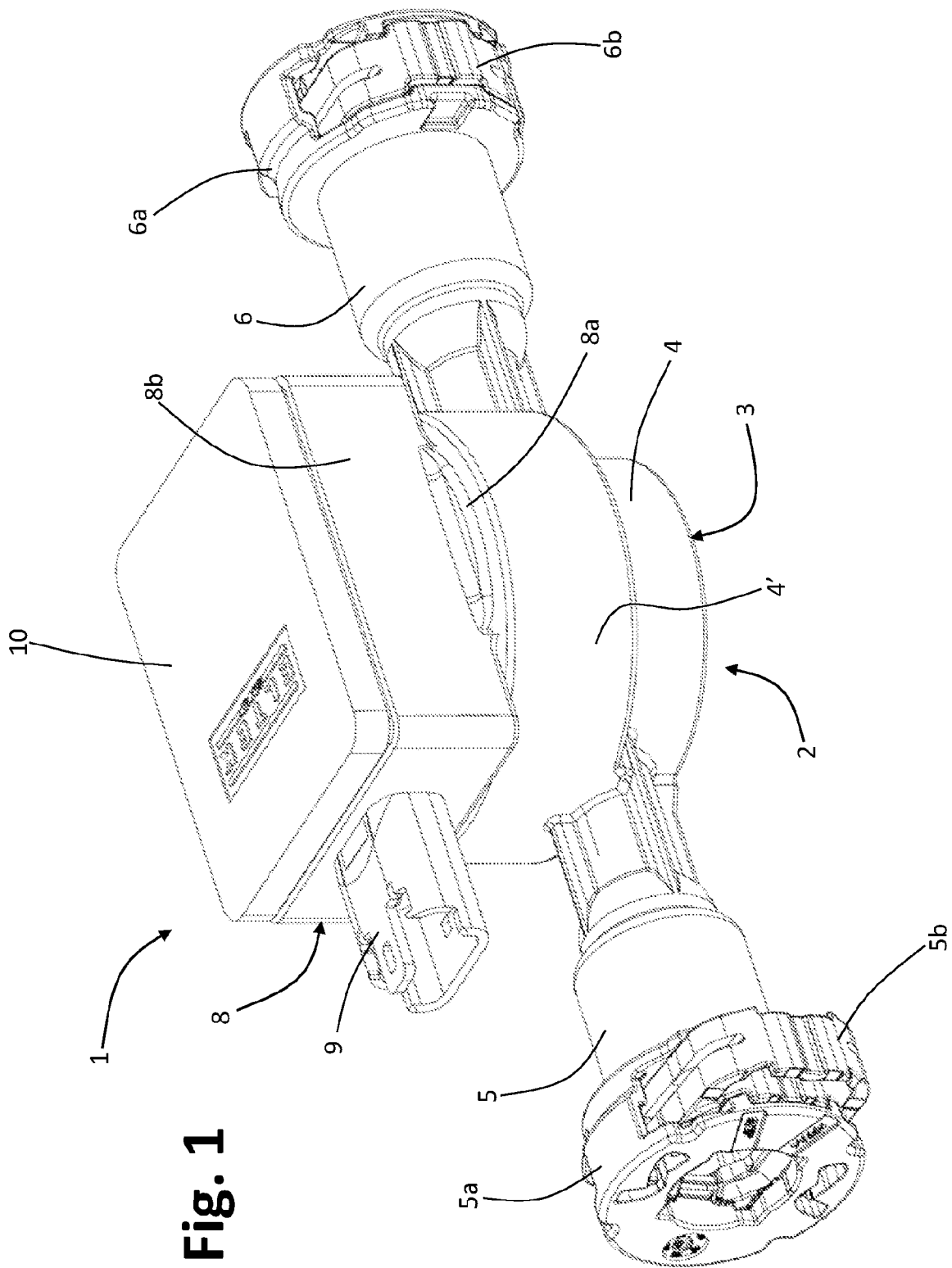
FIG. 1 is a schematic perspective view of a sensor device according to possible embodiments of the invention.

In FIG. 1, designated as a whole by 1 is an optical sensor device according to possible embodiments of the invention.

In the sequel of the present description, it is assumed that the device 1 is used for detecting one or more characteristics of a liquid additive, or reducing agent, which flows in a duct belonging to an exhaust-gas treatment system of an internal-combustion engine. The aforesaid treatment system may for example be of an SCR type, as explained in the introductory part of the present description, used for abatement of nitrogen-oxide emissions, for example, in motor vehicles, in particular with diesel engines. The aforesaid additive may hence be a solution of urea and distilled water, such as the one commercially known with the trade name AdBlue™.

Alternatively, for example, the device 1 could be used for detecting one or more characteristics of an additive, or a generic fluid substance, or a generic mixture of substances, which flows, for example, in a duct belonging to an ADI (Anti-Detonant Injection) system or in a duct of a "Water-injection" system.

The device 1 could in any case be applied to a tank, instead of to a duct, and/or be used for other purposes and/or in sectors other than the automotive one, and/or be designed for detection of at least one characteristic of a fluid substance different from a reducing agent (the ensuing definitions occasionally referring to a fluid substance or to a reducing agent can hence be understood in reference to a different fluid substance). In general, use of sensor devices according to the invention is particularly indicated in the case of optical detection on substances that contain water and are subject to possible freezing.

The device 1 has a supporting structure or body 2, preferably made up of a number of parts, at least some of which are coupled together in a fluid-tight way. In the example, designated by 3 is a first body part, configured for defining at least in part a space for flow or containment of the liquid substance being detected. In what follows, the first body part 3 will also be identified as "hydraulic body" given that this body is principally designed for carrying or containing the liquid substance. In the example, the hydraulic body 3 has a central portion 4, which is substantially cup-shaped and from which there extend two tubular portions 5 and 6, which are here assumed as being an inlet and an outlet for the liquid substance being detected. The tubular parts 5 and 6 define, or have associated to them, respective connectors 5*a* and 6*a* for connection in a hydraulic circuit for the liquid substance, in particular to hydraulic attachments of respective hydraulic ducts in which the substance circulates. In the non-limiting example, for this purpose the connectors 5*a* and 6*a* each include a dowel or similar blocking member 5*b* and 6*b*, respectively, or more in general may comprise hydraulic attachments of a quick-coupling type. The aforesaid connectors constitute a preferential, though not essential, characteristic given that they can be obtained with any other modality, or even be omitted (e.g., envisaging a fixing via welding or gluing of the two tubular portions 5 and 6 to respective ducts of the hydraulic circuit served).

As has been mentioned, moreover, the device 1 could be associated to a tank, in which case its hydraulic body 3 could be shaped otherwise with respect to what is exemplified in the figures, even without the aforementioned tubular portions: for instance, the hydraulic body of a device according to the invention could be mounted in the tank, or its body 3 could be defined at least in part directly by a portion of the body of the aforesaid tank.

In various embodiments, the hydraulic body 3 is made of a mouldable thermoplastic material, such as a polypropylene (PP), or a high-density polyethylene (HDPE), or a polysulphone (PSU), or a cyclo-olefin copolymer (COC).

Figure 2:
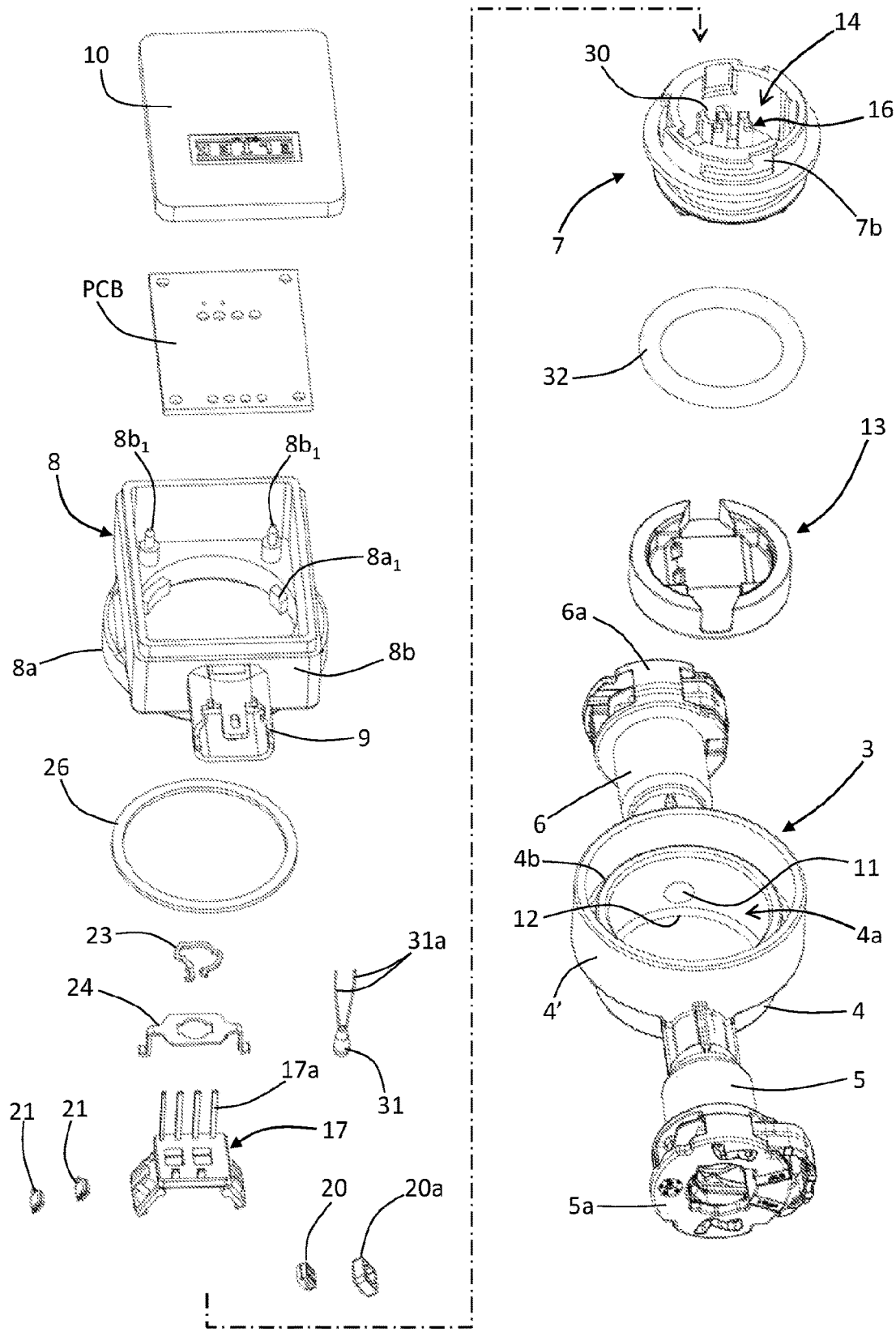
FIGS. 2 and 3 are exploded schematic views of a sensor device according to possible embodiments of the invention.
Figure 3:
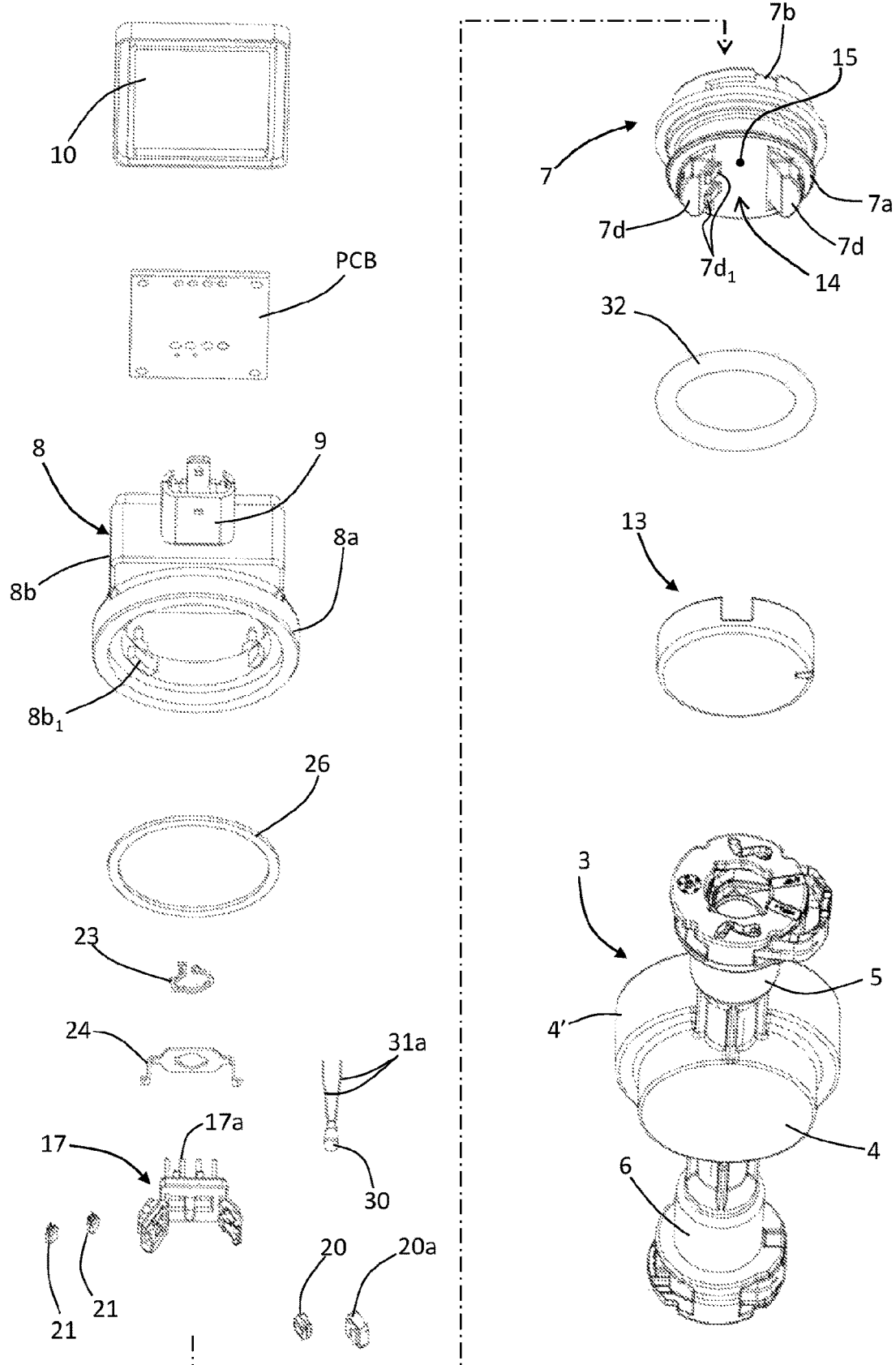

The body 2 of the sensor device 1 includes a second part, designated by 7 in FIGS. 2 and 3, designed to be coupled to the first part 3 at its cup-shaped central portion 4 or, more in general, at an area of the hydraulic body that defines at least in part the aforementioned space for containment or flow of the liquid substance. The body part 7 will be designated hereinafter also as "sensor body", considering that it comprises an optical arrangement; i.e., it defines and/or has associated optical-detection parts of the device 1. As will be seen, in various embodiments, the sensor body 7 is at least partially housed within the hydraulic body 3, or at least coupled to it so that an outer surface thereof can be reached by the liquid substance.

In various embodiments, the body 2 of the sensor device 1 further includes a third body part 8, which is designed to be coupled to the hydraulic body 3, with the sensor body 7 set in between. The body part 8 will be identified hereinafter also as "casing body", considering that it encloses within it part of the componentry of the sensor device 1. In various embodiments, the casing body 8 defines or has associated a connector body 9, located in which are terminals for electrical connection of the device 1. Preferably associated to the body part 8 is a closing lid 10.

With reference, in particular, to FIGS. 2 and 3, it may be noted how, in various embodiments, the cup-shaped portion 4 of the hydraulic body 3 basically defines a housing 4*a*, laterally delimited by a wall 4', which is preferably substantially cylindrical, with the aforesaid housing 4*a* that is connected in fluid communication with the tubular parts 5 and 6, each defining a corresponding internal duct 11. In various embodiments, at the area of the hydraulic body 3 designed to receive the sensor body 7, a seat 12 is defined for the body of a protection or compensation element 13, in particular a body that is at least in part elastically deformable, described in detail hereinafter, belonging to a protection arrangement of the sensor device 1.

In the example, the seat 12 is defined at the bottom of the cup-shaped portion 4 of the body 3, or in a position generally opposite to the sensor body 7.

The sensor body 7 has a preferably cup-shaped body, preferably having a peripheral profile mating with that of the corresponding area where it is installed, herein represented by the housing 4*a*, i.e., by the corresponding substantially cylindrical wall 4' of the portion 4 of the hydraulic body 3.

Irrespective of the specific shape of its peripheral profile, the sensor body 7 is shaped so as to include a detection portion of the device 1, to which there is designed to be operatively associated at least a sensitive optical part of the sensor device 1, which comprises at least one corresponding electro-optical or opto-electronic component. In the example, the aforesaid detection portion, mounted on the body 7, is designated as a whole by 14.

In various embodiments, the detection portion 14 comprises at least one bottom or interface wall 7*a* of the sensor body 7, having an outer lower surface, designated by 15 in FIG. 3, which is designed to delimit at least one part of the aforementioned space for containment or passage of the liquid substance. The detection portion 14 preferably comprises also a positioning site for the aforesaid sensitive optical part, designated by 16 in FIG. 2, which is defined at the side of the interface wall 7*a* that is isolated from the liquid substance, i.e., its inner surface opposite to the surface 15. As will emerge hereinafter, in various embodiments the positioning site 16 comprises a particular conformation of the inner side or surface of the wall 7*a*, i.e., of a part thereof designed for propagation of light radiation.

With reference also to FIG. 4, in preferred embodiments, the detection arrangement, or the sensitive optical part, comprises at least one emitter of optical radiation and at least one receiver of optical radiation, with the detection portion 14 that is configured so as to contribute to propagation of at least part of the optical radiation from the emitter to the receiver. In what follows, for simplicity it is to be assumed that the aforesaid optical radiation is in the frequencies of the visible, it being possible, however, for the frequency of the optical radiation to be different for the purposes of implementation of the invention: consequently, in what follows reference will be made also to rays or beams of visible light.

In various embodiments, the detection portion 14 is made at least in part of a material designed for propagation of light, at least by refraction and/or reflection, and both the emitter and the receiver are operatively associated to the aforesaid portion 14. The above material is preferably a transparent material, for example selected from cyclo-olefin copolymers (COC), or a polysulphone (PSU), or a polypropylene (PP), or a high-density polyethylene (HDPE), it possibly, however, being a glass or silica or a material containing silicon.

In various preferred embodiments, the emitter and the receiver are part of a single optical module, which is mounted at the optical positioning site 16. Such an optical module, like the detection portion 14, can be obtained and operate according to the teachings of WO 2017/149476 A, filed in the name of the present Applicant.

In general, and with reference to FIGS. 2-4, the aforesaid module has a supporting and electrical-connection structure, designated as a whole by 17, which is preferably made in part of electrically insulating material and in part of electrically conductive material. Irrespective of the specific embodiment, the structure 17 of the optical module is prearranged for installation and electrical connection of a light emitter 20 and at least one light receiver 21. The emitter 20 may be a non-diffused Lambertian-emission light source; for example, a suitable LED and/or the receiver 21 may comprise two distinct receivers, such as photo-detectors or photo-diodes suitable for detecting the light emission generated by the emitter.

In various embodiments, the emitter 20 and the receiver 21 have the active parts for light emission and reception, respectively, which generally face one another, but are arranged at angles with respect to one another, preferably in such a way that the respective axes intersect. The relative-positioning angles for the emitter 20 and the receiver 21 substantially depend upon the type of material used for the detection portion 14, upon the type of optical radiation that it is intended to adopt, and upon the type of substance that it is to undergo detection. Preferential angles are, for example, those referred to in WO 2017/149476, to which the reader is referred.

In various embodiments, associated to the emitter 20 is an optical filter or spatial filter 20a, in particular having the purpose of selecting or concentrating the light beam. The spatial filter 20a is basically a component made of plastic material not permeable to the optical radiation or light, in particular moulded, for example mounted, directly on the emitter 20 or fixed to the structure 17. The filter 20a is preferably configured as a cap provided with an opening in a wall thereof opposite to the light source of the emitter 20, this opening being prearranged for filtering and selecting or concentrating the light beam emitted by the emitter itself.

Projecting from the supporting and connection structure 17 are terminals used for electrical connection of the optical module, i.e., of the emitter 20 and of the receiver 21, to the control electronics of the device 1, in particular to a circuit support. Some of these terminals are designated by 17a in FIGS. 2-3 and 8-9, whereas the aforementioned circuit support is designated by PCB.

The positioning site 16 is basically constituted by a formation that rises, preferably orthogonally, from the inner side of the interface wall 7a and is designed to perform substantially functions of optical prism. This formation basically consists of a wall, designated by 22 in FIG. 4, which is made of the same material as the wall 7a, in particular a transparent material or a material permeable to the light or optical radiation used. The wall 22 defines, at its two opposite longitudinal edges, two inclined lateral faces or surfaces 23a and 23b, which are designed to face the emitter 20 and the receiver 21, respectively.

Once again with reference to FIG. 4, in various embodiments the wall 22 is divided at least partially by an intermediate cavity so as to define two upright parts 22a and 22b, preferably substantially specular with respect to one another. The aforementioned intermediate cavity may advantageously receive a corresponding part of the connection and supporting structure 17 of the optical module, and the upper ends of the two upright parts 22a and 22b can be shaped so as to provide positioning appendages, which are not designated by a reference number but are clearly visible in FIG. 4, to which a blocking member is designed to be coupled, designated by 24, prearranged for withholding in position the structure 17 itself on the site 16, i.e., on the detection portion 14.

In various embodiments, the aforesaid appendages and the member 24 are exploited also for fixing in position an elastic element 25 for positioning the optical module, i.e., its structure 17. The elastic element 25, preferably made of metal material, has a central part provided with a tabbed hole (see FIGS. 2 and 3), in order to enable fixing thereof on the aforesaid appendages, as well as generally curved opposite elastic arms, designed to exert an elastic force on the structure 17 of the optical module at the areas where the emitter 20 and the receiver 21 are installed. With reference to FIG. 4, the force exerted by the elastic element 25 (i.e., by its two opposite arms) guarantees, on the side of the emitter 20, that the spatial filter 20a bears upon the optical surface represented by the inclined surface 23a, and is correctly positioned with respect thereto. On the side of the receiver 21, the force exerted on the element 24 guarantees, instead, that a purposely provided lower projection 17b of the structure 17 of the optical module bears upon the inclined surface 23b, with the receiver 21 that remains preferably facing the optical surface 23b at a slight distance therefrom. Consequently, as may be noted from FIG. 4, in the assembled condition of the optical module, the emitter 20, on one side, and the two photo-detectors that provide the receiver 21, on the other side, are set facing and generally parallel to the inclined surfaces 23a and 23b, respectively, of the wall 22. The inclination of the optical surfaces 23a and 23b is preferably calculated so that the optical radiation will traverse it in a direction as far as possible orthogonal with respect to the surfaces of entry and exit of the light, so as to minimise reflection at the air-solid and solid-air interfaces, respectively.

In various embodiments, the sensor device according to the invention comprises at least one temperature sensor, for detecting at least one of a temperature of the liquid substance and an ambient temperature, such as the temperature of the air within the body 2 of the device itself. In various embodiments, at least one temperature sensor, for example of an NTC type, can be mounted on the sensor body 7 so as to be substantially in contact with the inner surface of the interface wall 7a, i.e., with the same side as that at which the site 16 is defined. For instance, in the case exemplified (see FIGS. 2, 3, and 9), the sensor body 7 defines a seat 30 for the detection part of a temperature sensor 31, the connection pins or terminals 31a of which are electrically connected to the circuit support PCB.

In various embodiments, such as the one exemplified herein, the measurement made by the at least one temperature sensor 31 is an indirect measurement, given that the temperature sensor is not directly in contact with the liquid substance. It will be appreciated in fact that, in various embodiments, the at least one temperature sensor 31 is housed within the sensor body 7, and hence in a position isolated from the substance. For this purpose, in various embodiments the control circuit arrangement of the device 10—implemented on the support PCB—is prearranged for carrying out an appropriate compensation of the measurement of temperature made, which takes into account at least the presence of a wall (here the wall 7a), set between the temperature sensor 31 and the liquid substance (for example, in a memory of the circuit arrangement there may be contained corresponding corrective parameters, based upon experimental analyses).

To return to FIGS. 1-3, the casing body 8, which is preferably axially hollow, has a lower portion 8a, designed for coupling with the hydraulic body 3, and an upper housing portion 8b, to which the lid 10 is designed to be coupled. The lower portion 8a preferably has a peripheral profile substantially corresponding to that of the central portion 4 of the hydraulic body 3, here a substantially cylindrical profile; in the example, the portion 8a is designed to be partially received within this cup-shaped portion 4, in particular surrounded at least partially by the wall 4' (see, for example, FIGS. 9 and 10), but a reversed configuration is evidently possible. Mutual fixing between the two body parts 8 and 3, preferably but not necessarily in a fluid-tight way, may be obtained in any suitable manner, for example by welding, or gluing, or with a threaded coupling, or with an engagement mechanism, or with a bayonet coupling, etc. As will be seen, according to other embodiments the two bodies 8 and 3 can, instead, be coupled in a displaceable or movable way with respect to one another.

Preferably, the casing body 8 is mechanically fixed to the sensor body 7, but the bodies 7 and 8 could possibly also be made of a single piece or be co-moulded. In various preferential embodiments, the bodies 7 and 8 are configured as distinct parts, joined together by means of a coupling substantially of the snap-action type and/or of the bayonet-coupling type, possibly, however, being welded or glued together. In the example illustrated, along the internal perimeter of the through cavity that traverses the lower portion 8*a* of the casing body 8 there are provided for this purpose reliefs 8*a*$_1$, designed for engagement in respective seats 7*b* defined on the outside of the cylindrical peripheral wall of the sensor body 7, said reliefs 8*a*$_1$ and seats 7*b* being shaped to provide a bayonet coupling.

Preferably provided between the sensor body 7 and the casing body 8 is a gasket made of an elastic material, in particular elastomer material, which is designated by 26, for example in FIGS. 2-3. In various embodiments, the aforesaid gasket 26 does not necessarily perform sealing functions and is primarily intended to enable a relatively elastic coupling between the sensor body 7 and the casing body 8, in particular when they are constrained to one another by means of a bayonet coupling or snap-action coupling, or other type of engagement mechanism designed to enable a pre-defined movement with respect to one another. The gasket 26, here substantially shaped like a flat ring, can in any case perform also sealing functions, as in some embodiments described hereinafter. As may be noted, for example in FIGS. 9 and 10, the gasket 26 can be set between respective peripheral steps or reliefs defined in the peripheral parts of the lower portion 8*a* of the body 8 and of the body 7: in the example, defined on the inner side of the portion 8*a* is a step 27, whereas defined on the outer side of the peripheral wall of the body 7 is an annular relief or flange 28.

The body 8 may be made of a material similar to the one used for formation of the body 3, preferably a mouldable thermoplastic material (as has been said, preferred materials are polypropylene, high-density polyethylene, polysulphone, or a cyclo-olefin copolymer).

In FIG. 2 it may be noted how the top upper portion 8*b* of the casing body 8 can define a respective through cavity, which, together with the lid 10, delimits a housing for at least part of the electrical and/or electronic componentry of the sensor device. In a preferred embodiment, at least part of this componentry is mounted on an electrically insulating substrate, which provides the aforementioned support PCB. The support PCB is preferably made of a material suitable for producing printed circuits, such as FR4 or a similar composite material of a fibreglass type, or else a ceramic material or a polymer-based material, preferably a mouldable material. Advantageously, inside the housing defined by the portion 8*b* of the body 8 there may be provided elements 8*b*$_1$ for positioning and/or fixing of the support PCB, such as pins or similar elements.

Associated to the support PCB is prevalently the electronic componentry for detection and/or control of the device 1, which is connected to the optical sensor that includes the emitter 20 and the receiver 21. The aforesaid componentry preferably includes the components for treatment and processing of signals regarding detection of at least one characteristic of the substance, such as its quality or composition, and possibly, as has been said, its temperature. In various embodiments, the aforesaid componentry comprises an electronic controller, for example a microprocessor or a microcontroller, which preferably includes at least one processing and/or control logic unit, a memory circuit, and inputs and outputs, amongst which inputs of an analog/digital type. The aforesaid componentry then comprises elements for conditioning and/or treatment of signals regarding detection of quality and/or temperature of the liquid solution.

Figure 8:
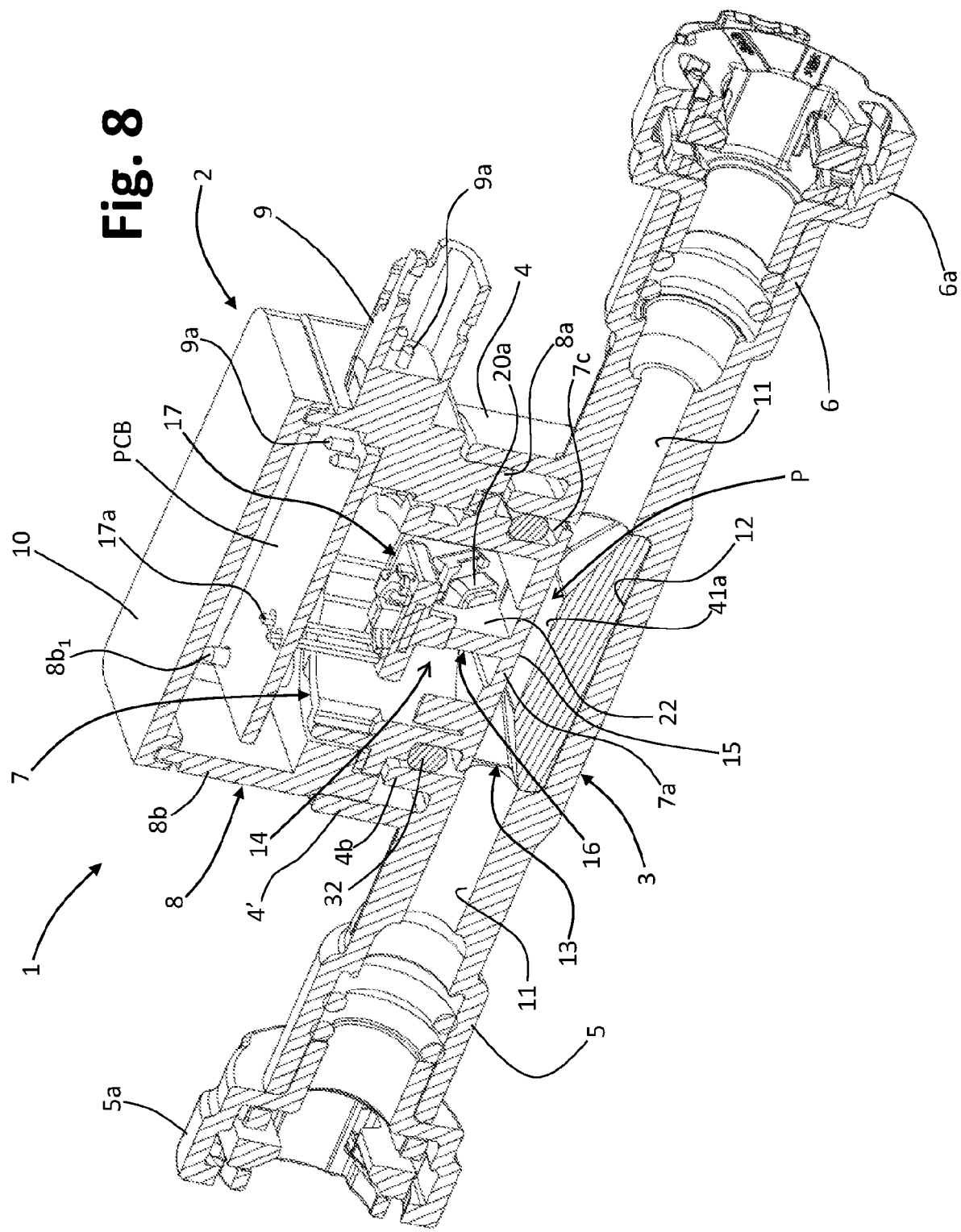
FIG. 8 shows a schematic longitudinal section of a sensor device according to possible embodiments of the invention.
Figure 9:
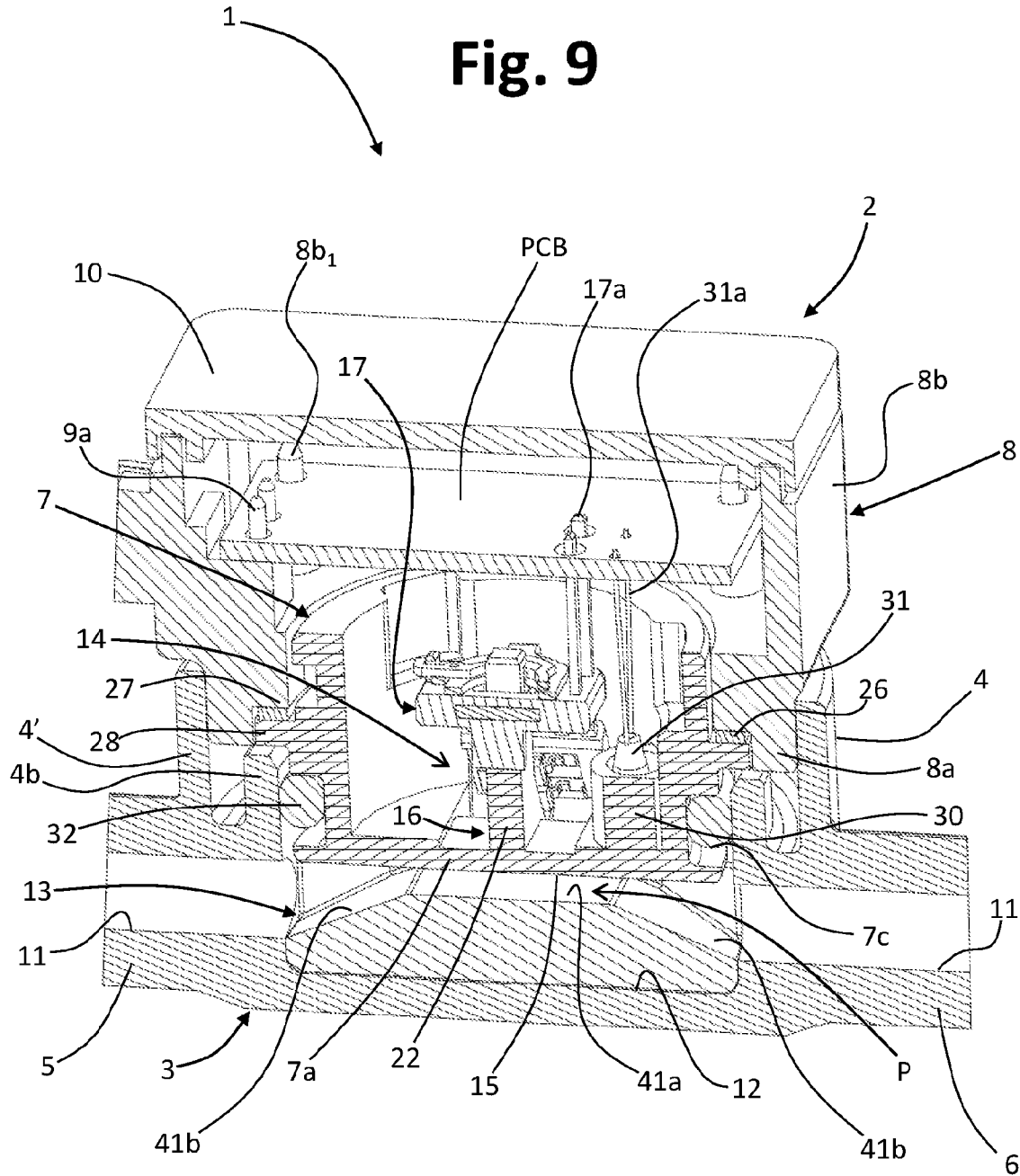
FIG. 9 is a longitudinally sectioned schematic perspective view of a part of a sensor device according to possible embodiments of the invention.
Figure 10:
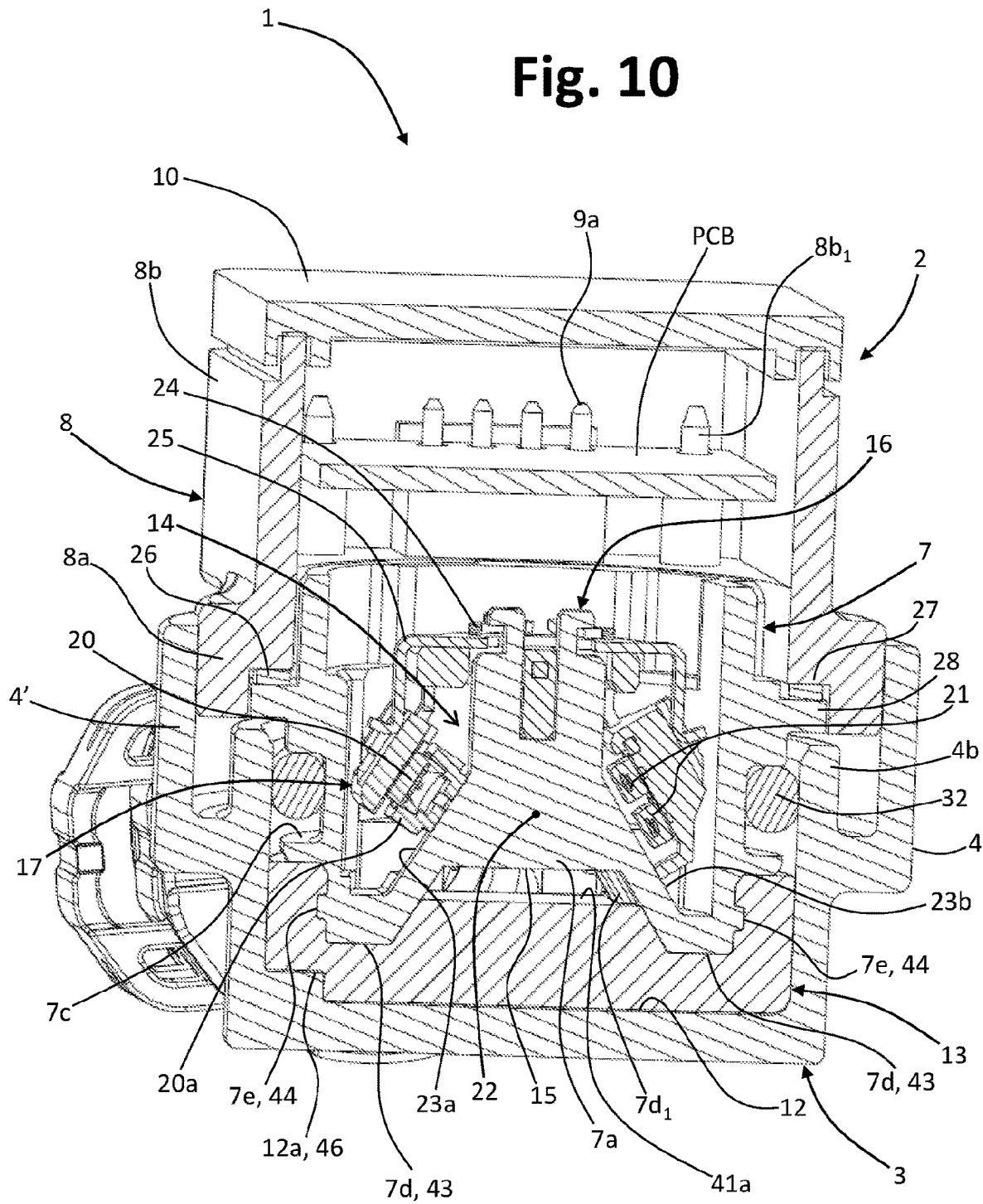
FIG. 10 is a transversely sectioned schematic perspective view of a part of a sensor device according to possible embodiments of the invention.

Preferably associated to the support PCB are corresponding terminals for external electrical connection of the device 1, which are partially visible in FIGS. 8-10, where they are designated by 9*a*. Said terminals 9*a*, together with the connector body 9 previously referred to, provide an interface or connector for external electrical connection of the device 1, for example to an electronic control unit of a system on-board a vehicle.

As already mentioned, and as partially visible in FIGS. 9 and 10, the sensor body 7 is at least partially inserted in the housing (4*a*, FIG. 2) delimited peripherally by the wall 4' of the portion 4 of the hydraulic body 3—or in any case preferably coupled to the body 3 in a substantially fixed position—so that the outer surface 15 of the interface wall 7*a* is in contact with the liquid substance; namely, it delimits at least part of the space for containment or flow of the substance. For this reason, in various embodiments, provided between the two bodies 3 and 7 is at least one sealing element 32, such as a sealing ring made of elastomer material. In the example illustrated, the element 32 is designed to create a seal of a radial type, between the peripheral wall of the sensor body 7 and an inner cylindrical wall 4*b* defined within the aforesaid housing (4*a*, FIG. 2), i.e., a wall having diameter smaller than that of the wall 4' and concentric therewith. Preferably, at least one of the two bodies 3 and 7 defines a respective seat for positioning of the aforesaid sealing element 32: in the example illustrated (see FIGS. 8-10), the aforesaid seat—designated by 7*c*—is defined in the sensor body 7, in particular at the outer side of the peripheral wall thereof, with the element 32 that on the other side is designed to operate on the inner side of the aforesaid inner cylindrical wall 4*b* of the body 3.

It is also preferable for the bodies 3 and 7 to define respective abutments or contrast surfaces for reciprocal rest. Once again with reference to the example of FIGS. 8-10, the hydraulic body 3 exploits for this purpose the aforementioned inner wall 4*b*, upon the upper end of which the lower surface of the annular relief or flange 28 used for positioning the gasket 26 may come to bear.

In FIGS. 8-10, the device 1 is illustrated in an assembled condition thereof. As explained previously, in various embodiments, the sensor body 7 is fixed to the casing body 8 (here via a bayonet coupling), and the casing body 8 is fixed to the hydraulic body 3. The bodies 7 and 3 are coupled in a fluid-tight way (here via the element 32) so that at least one surface of the body 7 (here the outer surface 15 of the interface wall 7*a*) delimits at least one part of a space for containment or passage of the substance that is to be detected.

According to one aspect of the invention, the optical sensor device comprises a protection arrangement, configured for preventing any possible damage or deformation (thereby including also failure), of at least part of the body 2 or of its detection portion 14, which could be caused by an increase in volume of the substance or by a thrust generated thereby, for example in the case of freezing thereof.

The aforementioned protection arrangement comprises at least one compensation element, such as the one designated previously by 13, which has a body at least in part elastically deformable or yieldable. In various embodiments, the elastically deformable body of the at least one compensation element is liable to contract, or allow itself to be at least in part compressed, in order to compensate thereby any possible increase in volume of the substance. In other embodiments, instead, the elastically deformable body of the at least one compensation element operates substantially as spring, for enabling a reversible displacement of the detection portion 14, or of the body 7 that integrates it, following upon such possible increase in volume.

In various embodiments, the elastically deformable body of the at least one compensation element is made of an elastomer material, or an elastic and/or at least in part compressible polymer, having a bulk modulus comprised between 0.1 MPa and 1 GPa, preferably between 0.2 MPa and 100 MPa, very preferably between 0.5 MPa and 10 MPa, in particular between 1 MPa and 5 MPa. Once again preferably, the material used has a hardness of between 5 Shore A and 100 Shore A, preferably between 10 Shore A and 70 Shore A, very preferably between 15 Shore A and 30 Shore A.

It is particularly advantageous to obtain the aforesaid elastically deformable body using a silicone material, such as an silicone elastomer or a liquid silicone rubber (LSR) or fluoro liquid silicone rubber (FLSR), preferably a bicomponent material or a bicomponent silicone. According to various embodiments, the elastically deformable body may also be co-moulded with, or overmoulded on, the sensor body 7 or the hydraulic body 8.

In the case exemplified in FIGS. 1-10, the body of the compensation element 13 is designed to come into contact with the liquid substance: for this purpose, as has been said, the element 13 is positioned at the corresponding seat 12 defined in the hydraulic body 3, which is located substantially in an intermediate position with respect to the ducts 11 defined by the tubular portions 5 and 6 of the body 3. More in general, in applications of this type, it is preferable for the aforementioned elastically deformable body to delimit at least a part of the space for containment or passage of the fluid substance.

Figure 6:
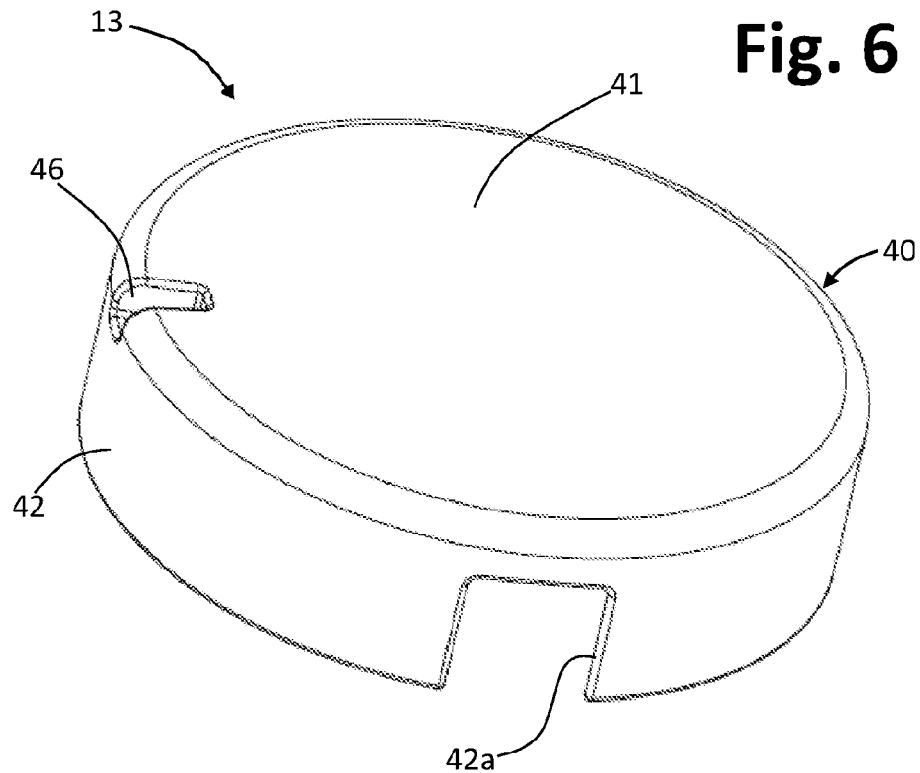
Figure 7:
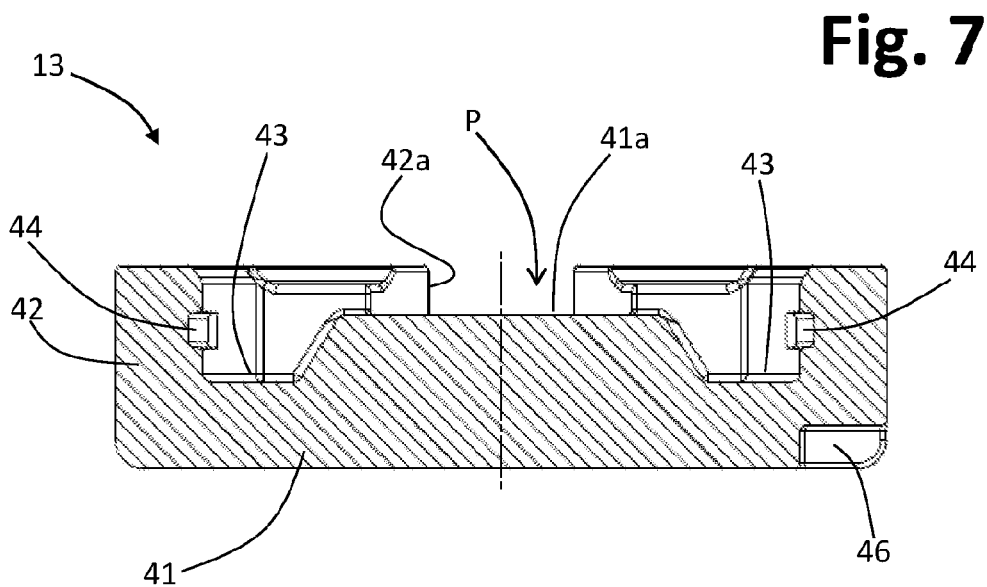
FIG. 7 is a schematic cross-sectional view of the compensation element of FIGS. 5-6.

A possible embodiment of a compensation element 13 is illustrated schematically in FIGS. 5-7. In these figures, designated by 40 is the elastically compressible body of the element 13, which preferably comprises a bottom wall 41 and a peripheral wall 42, here having a substantially circular profile.

The bottom wall 41 and/or the peripheral wall 42 are preferably shaped so as to define a cavity or passage P, designed to enable the presence and/or flow of the liquid substance.

For this purpose, in the example, the peripheral wall 42 has two interruptions 42a, preferably but not necessarily in diametrally opposite positions. Once again preferably, the bottom wall 41 is shaped so as to be thicker in its central area 41a, for the purposes clarified hereinafter, whereas at the interruptions 42a of the side wall 42 it defines inclined surfaces 41b, in form of ramps for entry and exit of the liquid substance. Also at the interruptions 42a there may be provided inclined walls, for example for fluid-dynamic reasons.

In various preferential embodiments, the elastically compressible body 40 defines at least one coupling seat for a corresponding coupling part of the detection portion 14 or, more in general, the sensor body 7. Preferably, at least part of the body 40 has a shape that is substantially complementary to, or is designed to couple with, at least part of the detection portion 14 or of the body 7.

In the case exemplified, for instance, in the region circumscribed by the peripheral wall 42 two lateral seats 43 are defined, in particular at the bottom wall 41, in each of which a corresponding lower projecting portion of the bottom or interface wall 7a of the sensor body 7 is to couple: these projecting portions are, for example, designated by 7d in FIGS. 3 and 4. From FIG. 10 it may be clearly noted how, in the mounted condition, the aforementioned lower projecting portions 7d are engaged in the seats 43 given that they can also contribute to ensuring axial positioning of the body of the compensation element 13 within the corresponding seat 12 defined in the hydraulic body 3. Alternatively, the areas defined as seats 43 could be configured as reliefs, and the projecting portions 7d could be configured as seats, or also have other combinations of shapes in any case designed to define areas of mutual coupling between the parts (preferably areas or shapes designed to enable a unique coupling in a substantially pre-defined position, also to prevent any risk of installation thereof in a wrong position).

Advantageously, also the peripheral wall 42 of the compressible body 40 may be provided with one or more seats designed to co-operate with corresponding engagement parts of the detection portion 14, or of the sensor body 7. In the case exemplified, for example, on the inner side of the peripheral wall 42, in diametrally opposite positions, two further seats 44 (see FIG. 7) are defined, in each of which a corresponding radial projection of the body 7 is designed to couple, these projections being here defined on the outside of the peripheral wall of the sensor body 7, substantially at the interface wall 7a. These radial projections are, for example, designated by 7e in FIGS. 4 and 10. From the latter figure it may be noted how, in the mounted condition, the aforementioned projections 7d are engaged in the seats 44 in order to contribute to ensuring a coupling in a radial direction of the compensation element 13, possibly also contributing to positioning with respect to the sensor body 7 and/or to the hydraulic body 3 and/or within the corresponding seat 12.

The means for positioning and/or fixing between the compensation element 13 and the sensor body 7 preferably also determine a pre-defined positioning of the compensation element 13 itself with respect to the structure 17 of the optical module and/or the outer lower surface 15.

Preferably, means are provided (such as the means 44 and 7e) for mutual engagement between the elastically compressible body 40 and the sensor body 7, which are useful also to be able to handle the two elements coupled together, for example in the production stage; alternatively, it would be possible to envisage gluing or welding between the elastically compressible body 40 and the sensor body 7.

Advantageously, the compensation element or its compressible body may be assigned a shape (e.g., via seats or reliefs) designed to co-operate with a corresponding shape or with engagement parts of the hydraulic body 3, for the purposes of mutual positioning and/or coupling or fixing; preferably, for this purpose means are provided that enable mutual assembly of the parts only in a pre-defined position (e.g., a mutual positioning or fixing of the wall 42 and/or the wall 41 of the body 40 to the seat 12). Preferably, means are provided for mutual fixing of the compensation element, or its elastically compressible body, to the hydraulic body 7, such as engagement or welding or gluing means, useful also for enabling handling of the two elements coupled together, for example in the production stage. In particular, the aforesaid means for positioning and/or fixing of the compensation element, or its compressible body, to the hydraulic body 3 also determine positioning of the compensation element, or its compressible body, with respect to the sensor body 7 and/or to the structure 17 of the optical module and/or to the outer lower surface 15 of the interface wall 7a.

In the example illustrated, at least one of the aforesaid lower projecting portions 7d of the body 7 has, on its outer side, at least one longitudinal relief $7d_1$ (see FIGS. 3 and 10), which can equally be coupled in a corresponding seat 45 defined in the elastically compressible body 40.

The aforesaid coupling of the parts 7d, and/or 7e, and/or $7d_1$ to the corresponding seats 43, and/or 44, and/or 45, also prevents possible risks of rotation of the body 40 within the corresponding seat 12; or enable the aforesaid installation of the body 40 of the compensation element 13 only in the pre-defined position.

By the way, within the seat 12 there may also be provided at least one contrast relief, designated by 12a for example in FIG. 10, on which a corresponding or complementary radial recess 46 (FIGS. 6-7) is designed to be engaged, defined at the outer side of the bottom wall 42 of the body 40.

As may be noted, for example, in FIGS. 8-10, in the assembled condition of the device 1, the compensation element 13 is positioned substantially underneath and/or in the proximity of the detection portion 14, in particular with the upper surface of the central portion 41a of the bottom wall of the body of the element 13 that faces and/or is in the proximity of the outer side 15 of the interface wall 7a of the sensor body 7, in particular with the liquid substance that can hence flow or in any case be present in the passage P that traverses the element 13 in the diametral direction.

As may be noted, at least one portion of the element 13 faces the outer surface 15, at a distance therefrom, wherein the space between the two elements at issue can be occupied by the liquid substance.

The fact that the central portion 41a of the aforementioned bottom wall 41 (FIGS. 5-7) is preferably relatively thick or in relief enables, on the one hand, reduction of the section of passage for the liquid substance precisely in the detection area represented by the interface wall 7a and, on the other hand, increase in the amount of compressible material of the body of the element 13 precisely at the aforesaid wall 7a.

A bottom wall 41, shaped so as to bring about a reduction of the section of passage for the liquid substance, makes it possible to have a smaller thickness of frozen substance, and consequently a smaller expansion and a lower thrust in the direction of the interface wall 7a. From another standpoint, a bottom wall 41 shaped so as to determine a greater thickness or an increase in the amount of compressible material, enables a greater deformation and hence a greater compensation of expansion of the frozen substance and/or thrust exerted thereby, in particular in a direction opposite to that of the interface wall 7a.

As has been seen, provided upstream and downstream of the aforesaid central portion 41a are the aforementioned inclined stretches 41b (FIGS. 5 and 9) at the interruptions 42a of the peripheral wall 42 of the body 40 (FIG. 5) of the compensation element 13. In this way, it is possible to have available a passage P for the liquid substance that has an inlet area, the section of passage of which decreases or narrows as far as the aforesaid detection area, then followed by an adjacent area of outlet of the liquid substance, the section of passage of which then widens out again.

Preferably, the compensation element or its compressible body is obtained at least in part (as for the stretches 41b and/or the passage P) for conveying the liquid substance into pre-defined detection area, provided in which is the protection arrangement via compensation, here substantially in a position corresponding to the interface wall 7a.

Figure 11:
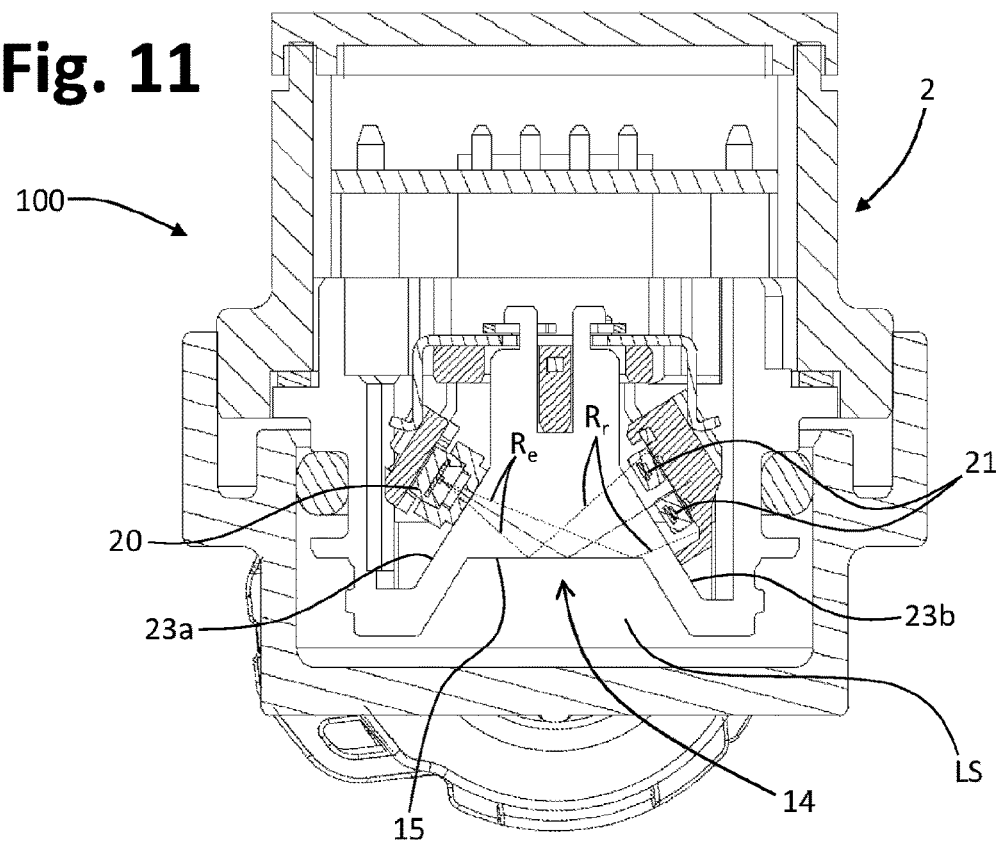
FIGS. 11 and 12 are schematic cross-sectional views of a generic sensor device not according to the invention, and of a sensor device according to possible embodiments of the invention, respectively, in a first condition of use.
Figure 12:
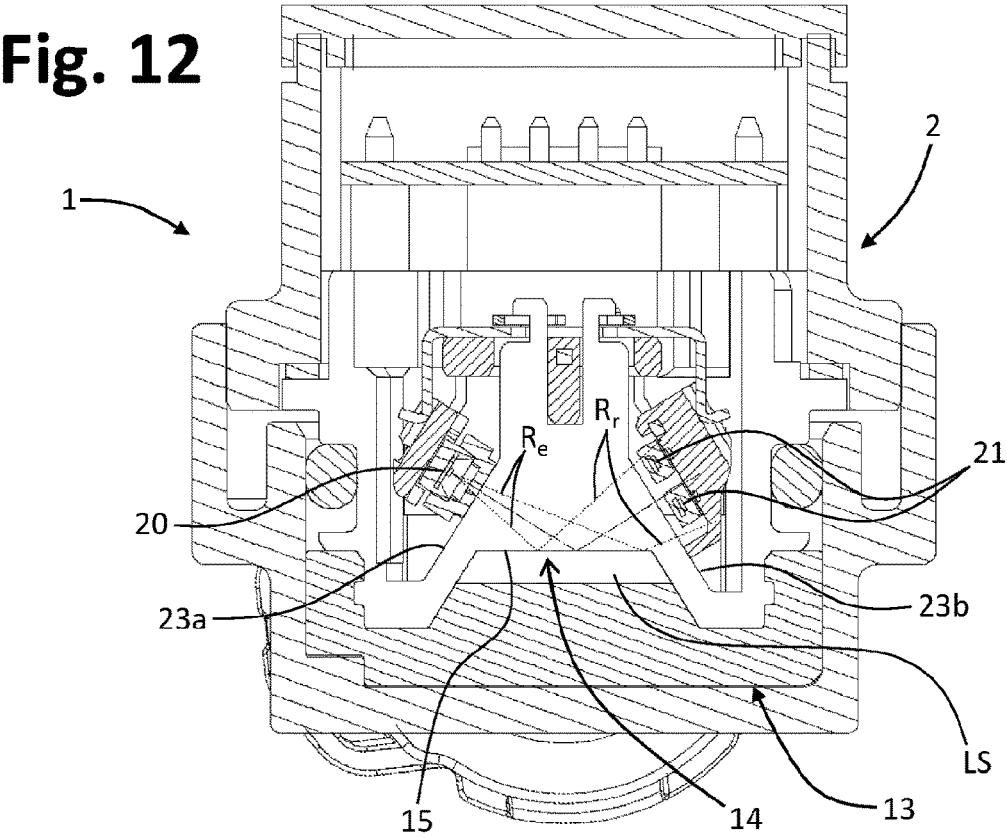
Figure 13:
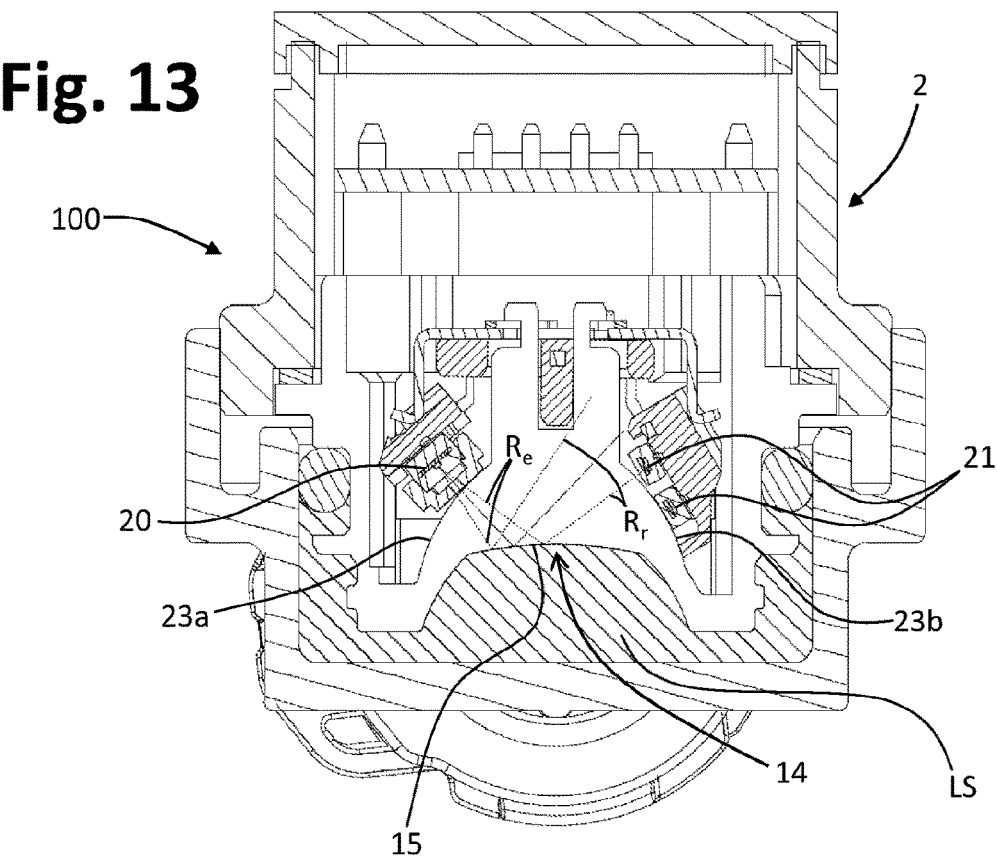
FIGS. 13 and 14 are schematic cross-sectional views similar to those of FIGS. 11 and 12, respectively, but with the two sensor devices in a second condition of use.
Figure 14:
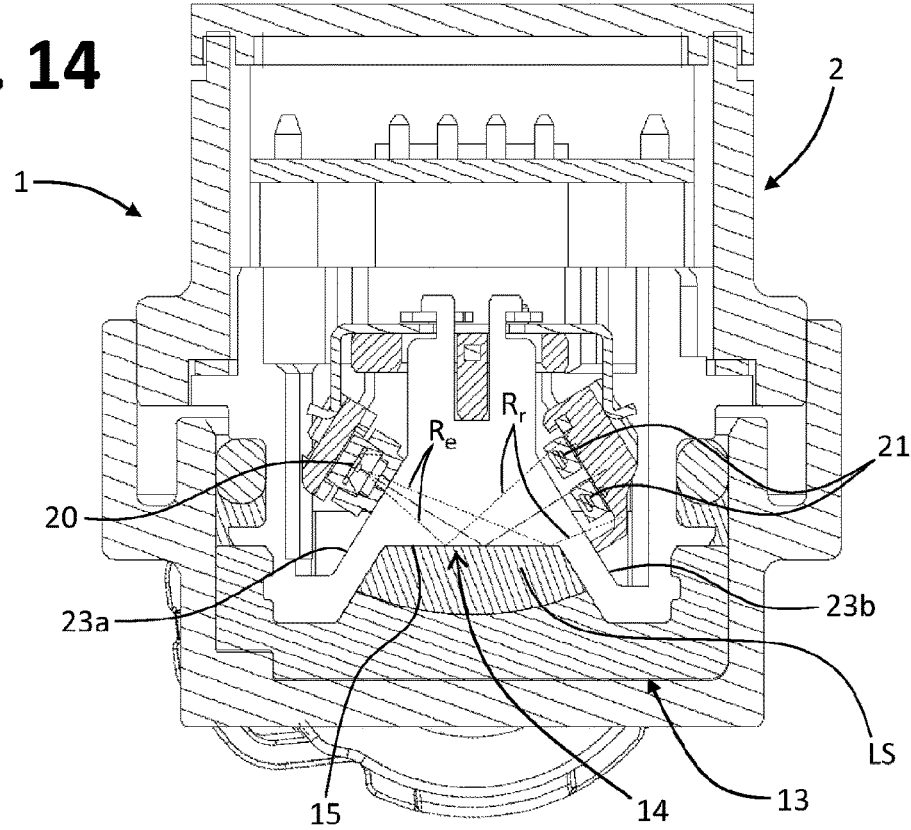

The principle underlying the invention will be described with reference to FIGS. 11-14, FIGS. 11 and 13 representing the case of a device 100 without the protection arrangement that includes the compensation element 13, and FIGS. 12 and 14 illustrating, instead, the case of a device 1 according to the invention, i.e., provided with the aforesaid protection arrangement that includes the compensation element 13.

As already mentioned, general operation of the quality sensor provided according to the invention is linked to the laws of optics that describe refraction/reflection of light radiation, and in particular to the critical angle of total reflection. More in particular, the operating principle is based on the dependence of the refractive index of the liquid substance upon the composition or concentration of the latter. The measurement is hence based on the jump of refractive index between the liquid to be analysed and the solid material of which the detection portion 14 is made (i.e., the interface wall 7a and the site 16 to which the emitter 20 and the receiver 21 are associated), exploiting the principle of total internal reflection at the interface between the two media. In other words, it is possible to exploit the existence of a critical angle of total reflection, which varies as a function of the concentration of the substance, in order to measure the latter, according to principles in themselves known. Also in this case the reader is referred to WO 2017/149476 A, for a detailed description of the principles of optical detection that can be used also in a device of the type considered herein.

In extreme synthesis, the interface surface (i.e., the outer surface 15 of the wall 7a in contact with the liquid) is illuminated via the emitter 20 at all the angles of interest around the critical angle, and hence with an angle of incidence greater and smaller than the critical angle. In this way, there will exist two areas: an area impinged upon by the totally reflected rays (deriving from the rays having an angle of incidence greater than the critical angle) and an area characterized by a lower intensity, which is impinged upon by the partially reflected rays (deriving from the rays having an angle of incidence smaller than the critical angle). It is thus possible to obtain, at output, a range of intensities in which the separation between the area with higher intensity of illumination (total internal reflection) and the area with lower intensity (partial reflection) is a function of the concentration of the liquid. Hence, using the two photo-detectors 21, through the variation of their output signal it is possible to evaluate the variation of the critical angle and consequently the variation of composition or concentration and, in the ultimate analysis, the quality of the liquid solution. For this purpose, the photo-detectors 21 are positioned so as to receive each one part of the reflected light beam, one photo-detector being impinged upon by the high-intensity light having an angle of incidence greater than the critical angle, and the other being impinged upon by the low-intensity light on the "tail" of the reflected beam.

In view of what has been said above, it will be appreciated that proper operation of the sensor device, i.e., the correctness of detection of concentration of the liquid substance, depends upon the geometry of the detection portion, and in particular upon the angles between the surface 15 and the axes of the emitter 20 and of the receiver 21, i.e., upon the relative inclinations between the optical surfaces 15, 23a and 23b.

FIGS. 11 and 12 illustrate a condition of normal operation of the devices 100 and 1, respectively, by "condition of normal operation" it being understood that the substance—designated by LS—is in its usual liquid state. In both cases, the radiation beam $R_e$ emitted by the emitter 20 impinges upon the interface between the outer surface 15 and the substance LS and is then partially reflected in a beam $R_r$, towards the receiver 21, with an angle that depends upon the concentration of the substance LS itself. As has been explained, from the variation of the signal at output from the receiver 21 it is possible to evaluate the quality of the liquid substance LS.

FIGS. 13 and 14 illustrate, instead, the case of an increase in volume of the liquid substance LS, due for example to freezing. For a more immediate understanding of the phenomenon, the frozen substance LS is represented (filled in) in a way different from the substance in the liquid state of FIGS. 11 and 12. A substantially similar situation may arise in the presence of an occasional over-pressure of the substance LS, for example due to a so-called ramming.

FIG. 13 shows how, in the device 100, the increase in volume of the substance LS determines a mechanical stress on the detection portion 14 such as to cause a deformation thereof, i.e., a variation of the geometrical configuration of the outer surface 15 (at the interface with the substance LS) and/or of the inclined optical surfaces 23a and/or 23b. It should be noted that the degree of deformation is deliberately exaggerated in FIG. 13, in order to bring out the phenomenon more clearly.

From FIG. 13 it will be appreciated how the aforesaid deformation of the surface 15 and/or of one or both of the surfaces 23a and 23b determines a variation of the angle of the emitted beam $R_e$ and, above all, of the reflected beam $R_r$. This variation does not depend, however, upon a variation of the concentration of the liquid substance LS, but is instead due to merely mechanical reasons, and in particular to the stress determined by the increase in volume of the substance. It hence appears evident that, in this case, there will be a significant error of detection on the part of the sensor device.

It is also evident that an excessive deformation could lead to failure of the interface wall 7a, with consequent infiltration of the liquid in the area where the electrical and/or opto-electronic components are housed, with consequent operating fault. The risk of failure is accentuated in the case of an interface wall 7a made of relatively brittle material or a material with low elasticity, such as a glass or certain types of polymers transparent to the optical beam.

From FIG. 14 it will be appreciated how, instead, in the device 1 according to the invention, the increase in volume of the liquid substance LS can be "relieved" in the opposite direction with respect to the interface surface 15; i.e., it is absorbed by the compensation element 13, which undergoes compression downwards. In this way, the detection portion 14 is not stressed mechanically, thereby safeguarding its geometrical integrity, and there hence do not occur variations of the angles of the rays $R_e$ and $R_r$ with respect to the case illustrated in FIG. 12 (obviously, except for variations in concentration of the substance LS). Following upon unfreezing of the substance LS, the body 40 of the compensation element 13 may again elastically assume its own initial configuration, as illustrated in FIG. 12, thus restoring the protection function.

Of course, also in the case of the device 100, when the substance LS unfreezes and returns to the liquid state, the detection portion 14 will no longer be subjected to the aforesaid mechanical stress. However, also in the case where no failure has occurred, the mechanical stress induced by the increase in volume of the substance could have led to overstepping of the threshold of elastic behaviour of the material of the sensor body (e.g., reaching a threshold of plastic deformation or yielding of the material); i.e., it could have produced permanent deformation: in this eventuality, the detection portion 14 and/or at least part of the interface wall 7a might not assume again its original geometrical configuration.

Consequently, even though the material that forms the detection portion, albeit necessarily relatively rigid, can present an albeit minimal elasticity, the aforesaid mechanical stresses could modify in an irreversible way the geometry of the surface 15 and/or surfaces 23a 3/or 23b, with inevitable detection errors. This problem is, instead, avoided in the device according to the invention.

In various embodiments, the optical sensor device 1 comprises at least two compensation members, each having an elastically deformable and/or at least partially compressible body.

Figure 15:
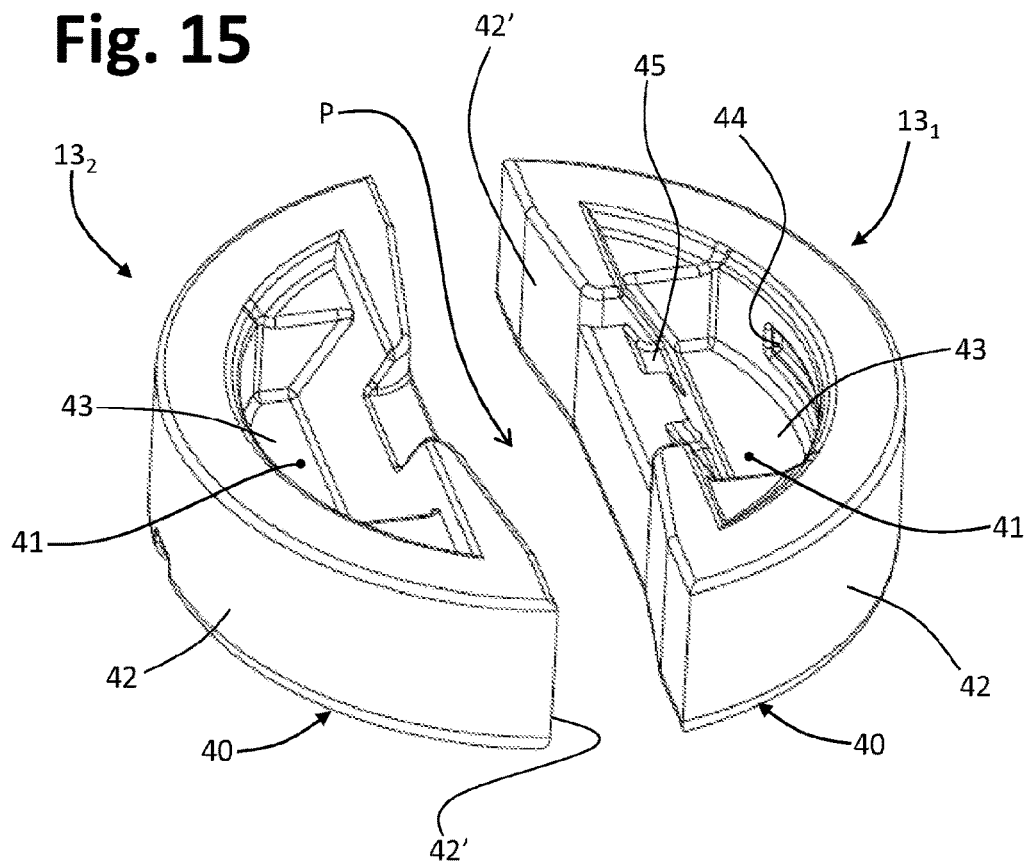
FIGS. 15 and 16 are schematic perspective views of two compensation elements that can be used in a sensor device according to possible embodiments of the invention.
Figure 16:
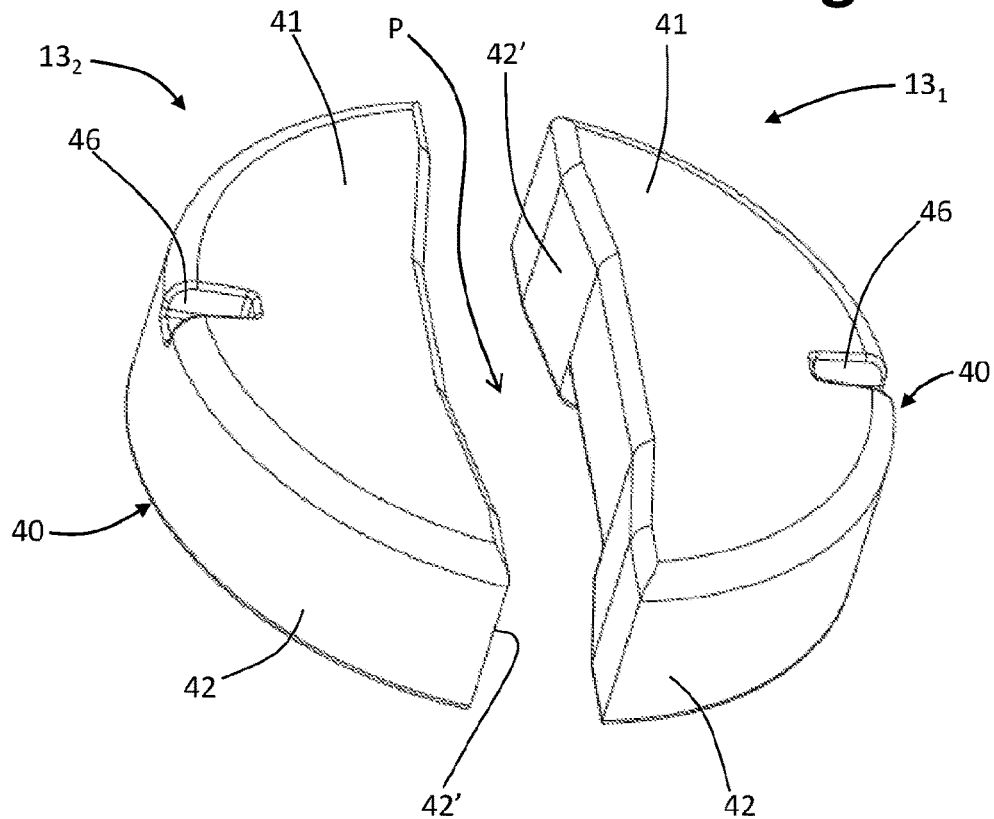

FIGS. 15 and 16 are schematic illustrations of a possible embodiment of two compensation elements, designated by $13_1$ and $13_2$, which can be used in a device according to the invention.

The elements $13_1$ and $13_2$ each have a respective elastically deformable body 40, the peripheral profile of which is substantially shaped like a circular sector or segment. Also in this case, each body 40 has a bottom wall 41 and a peripheral wall of its own, which here includes an arched wall portion 42 radiused at its ends by a longitudinal wall portion 42'.

Also in this case, each body 40 may define one or more seats equivalent to those designated by 43, 44, 45, and 46 with reference to FIGS. 5-7, or may define different and/or further positioning and/or fixing means. The elements $13_1$ and $13_2$ are sized, in particular in the radial direction of the corresponding arched wall portion 42, so that they can both be housed within the seat 12 provided in the hydraulic body 3, with the longitudinal wall portions 42' that are set facing one another at a certain distance: in this way, defined between the two wall portions 42' is the passage P for the liquid substance.

Figure 17:
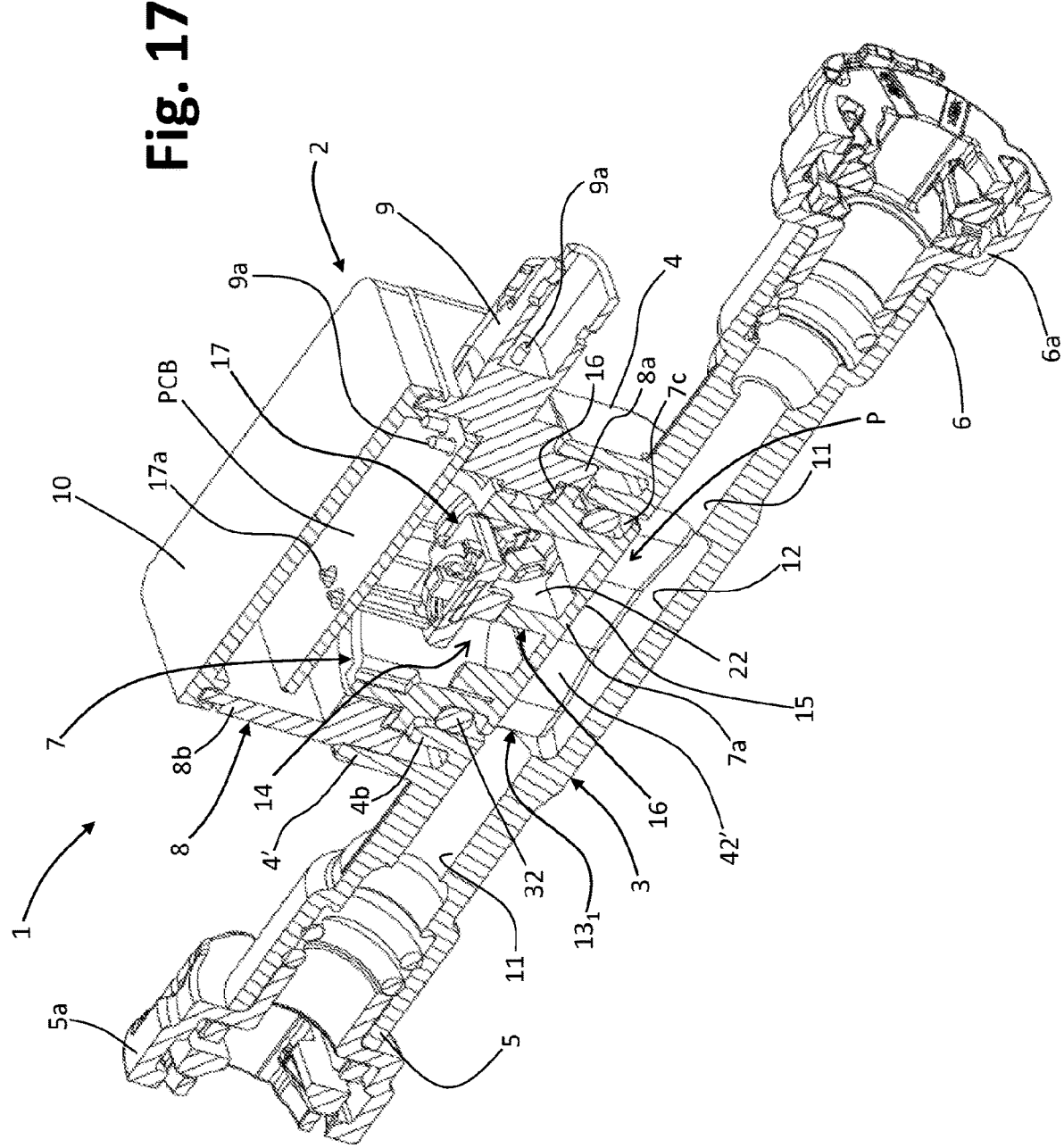
FIGS. 17, 18, and 19 are sectioned views similar to those of FIGS. 8, 9, and 10, respectively, corresponding to a sensor device that uses two compensation elements of the type illustrated in FIGS. 15-16.
Figure 18:
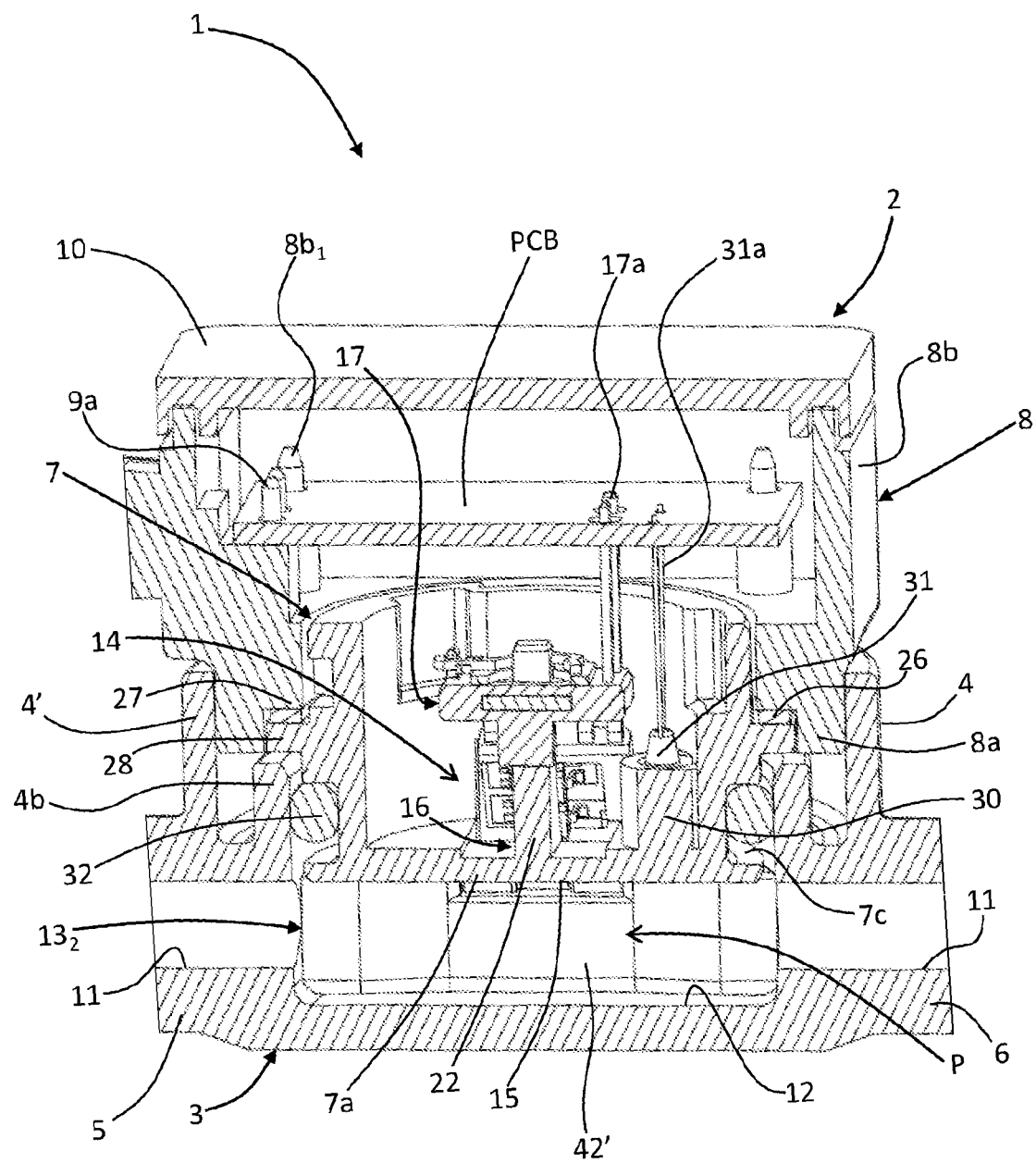
Figure 19:
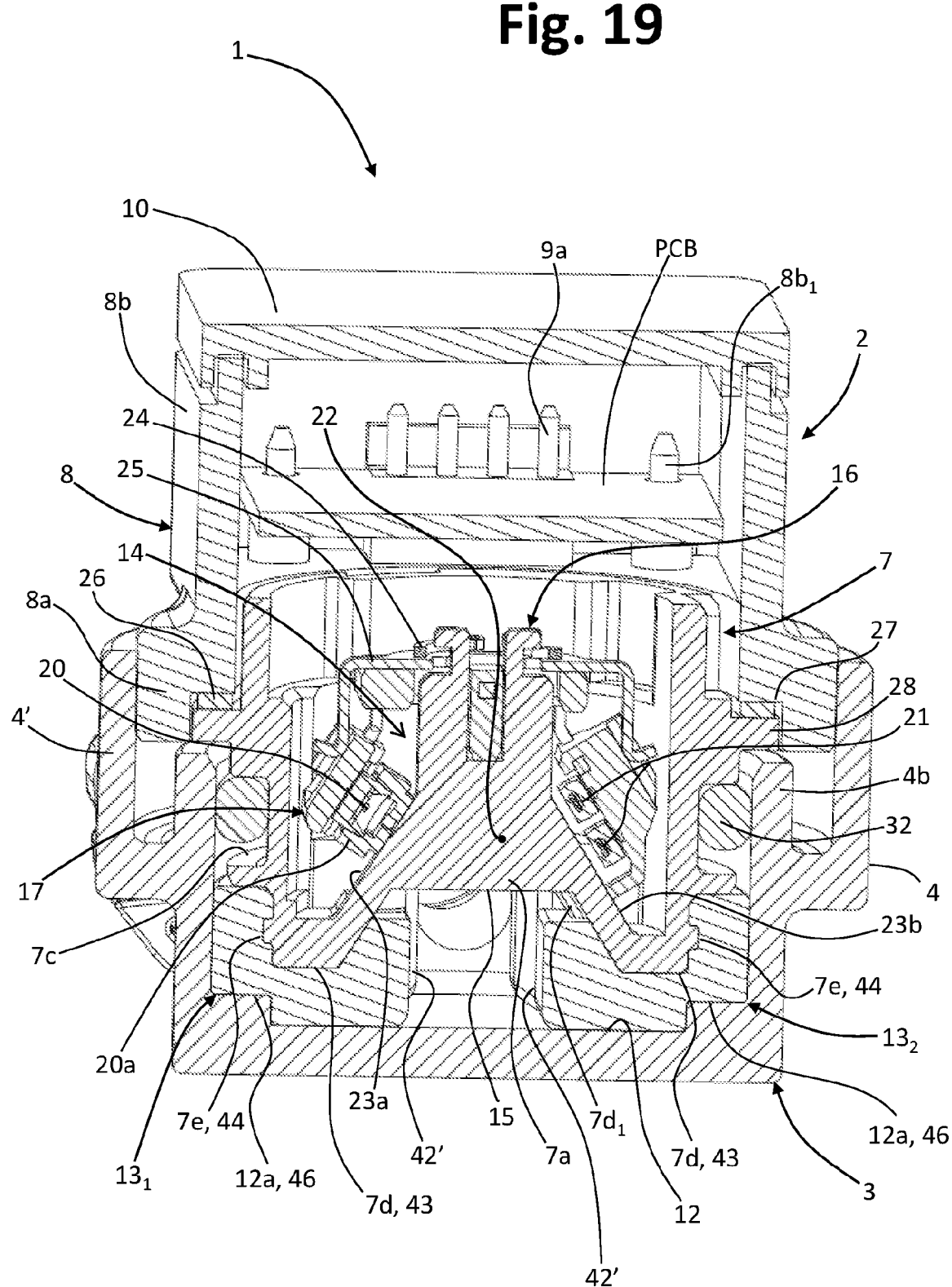

The compensation elements $13_1$ and $13_2$ in the assembled condition are visible in FIGS. 17-19, from which it may be noted how these elements are positioned within the seat 12, substantially so as to replace the single compensation element 13 of the previous embodiments. The elements $13_1$ and $13_2$ are positioned in the seat 12 so that the longitudinal wall portions 42' extend facing one another, preferably in the direction of the main flow of the liquid substance (i.e., the direction that connects the two tubular portions 5 and 6 of the hydraulic body 3), to define the passage P, as is clearly visible, for example, in FIG. 19. Of course, instead of the single seat 12, two distinct seats could be provided, one for each element $13_1$ and $13_2$, in order to enable the aforementioned positioning.

Figure 20:
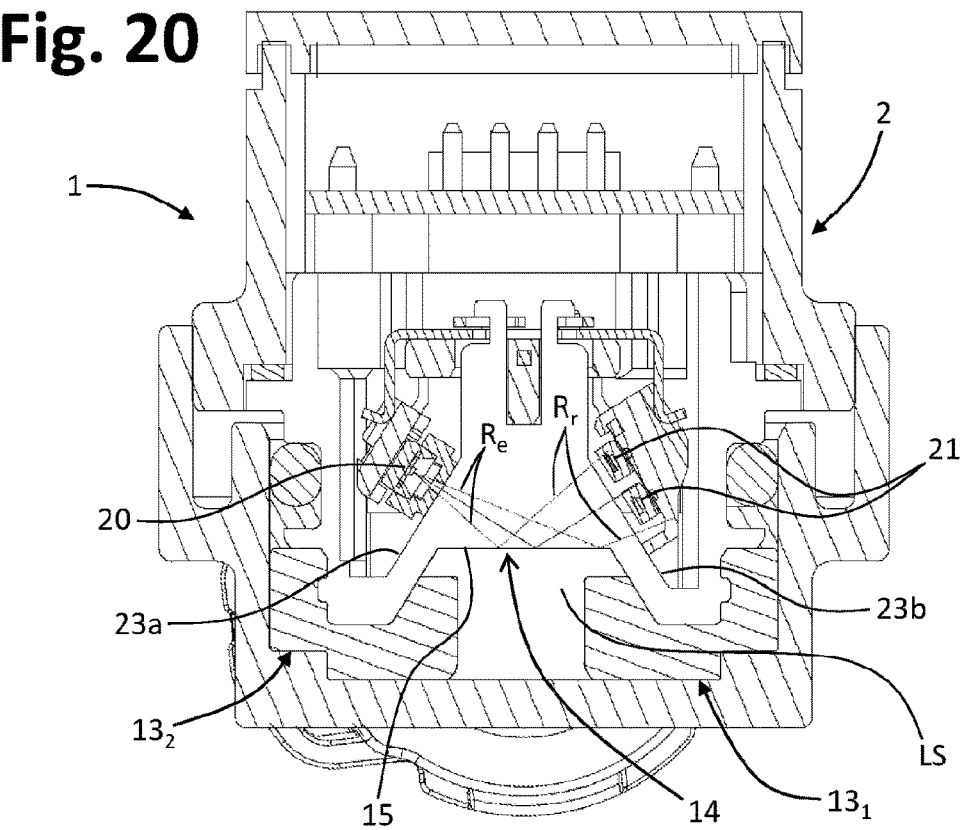
FIGS. 20 and 21 are schematic cross-sectional views of a sensor device of the type illustrated in FIGS. 17-19, in two different conditions of use.

Operation of the protection arrangement illustrated in FIGS. 15-19 is substantially similar to the one already described previously. For instance, represented schematically in FIG. 20 is a condition of normal operation of the device 1, namely, a condition in which the substance LS is in its liquid state. The beam of radiation $R_e$ emitted by the emitter 20 hence impinges upon the interface between the outer surface 15 and the substance LS and is partially reflected in a beam $R_r$ towards the receiver 21, with an angle that depends upon the concentration of the substance LS.

Figure 21:
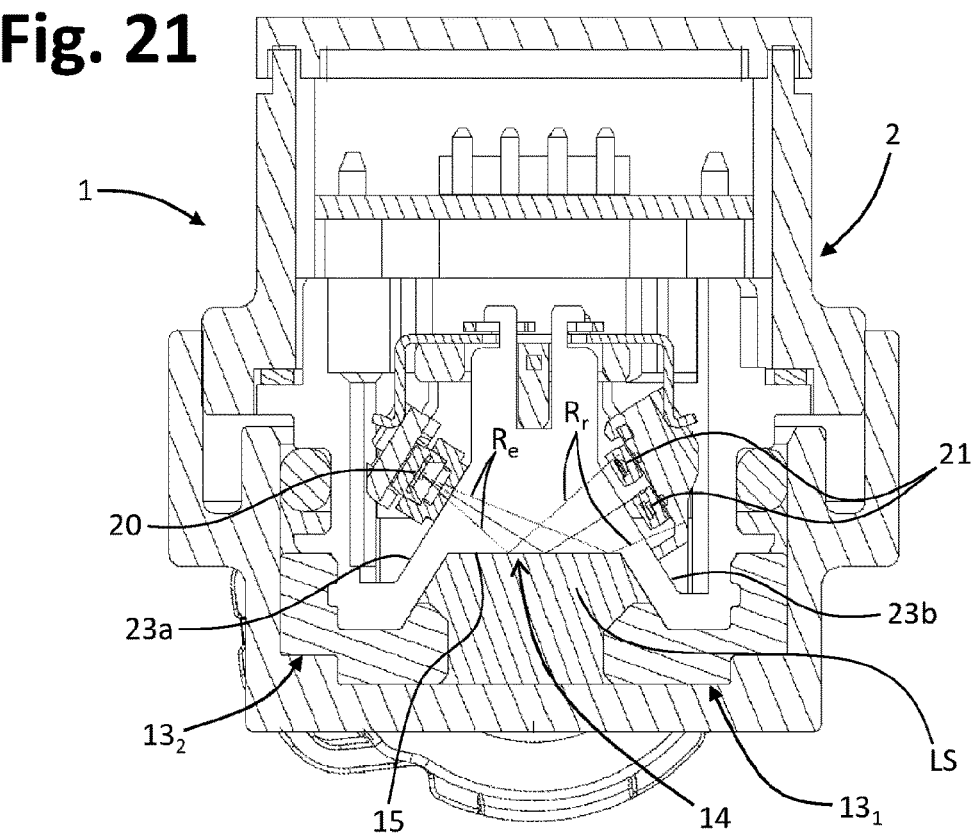

FIG. 21 illustrates, instead, the case of an increase in volume of the substance LS, due for example to freezing. In this case, the volume of the substance LS can mainly increase in the direction transverse to the direction followed by the substance itself when it is in the liquid state (i.e., transverse to the normal direction of flow between the ducts 11); i.e., it is absorbed by the two compensation elements $13_1$ and $13_2$, which undergo compression prevalently one towards the right and the other towards the left, respectively (as viewed in the figure), and in part also in the vertical direction. In this way, the detection portion 14 does not undergo mechanical stress, thereby safeguarding its geometrical integrity and the correctness of the angles of emission and reflection, as has been explained previously. Also in this case, following upon unfreezing of the substance LS, the bodies 40 of the compensation elements $13_1$ and $13_2$ may elastically assume again their initial configurations, as illustrated in FIG. 20.

In various embodiments, the protection arrangement provided according to the invention is conceived so that the part of the body of the device that bears the detection portion 14 can displace with respect to another part of the same body, from a first position to a second position, following upon the possible increase in volume of the liquid substance, this displacement being allowed by elastic deformation of the elastically deformable body of the compensation element.

Figure 22:
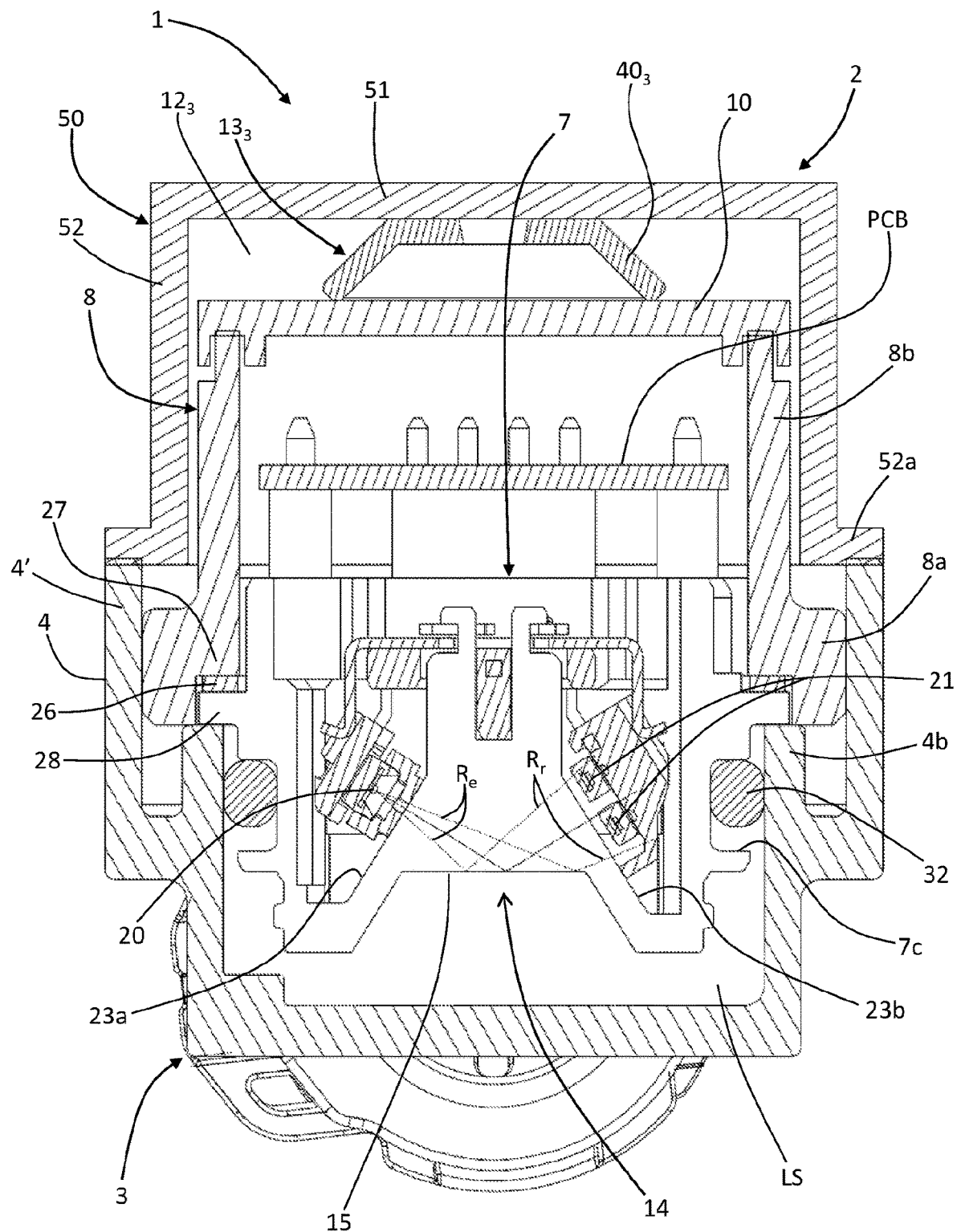
FIGS. 22 and 23 are schematic cross-sectional views of a sensor device according to further possible embodiments of the invention, in two different conditions of use.
Figure 23:
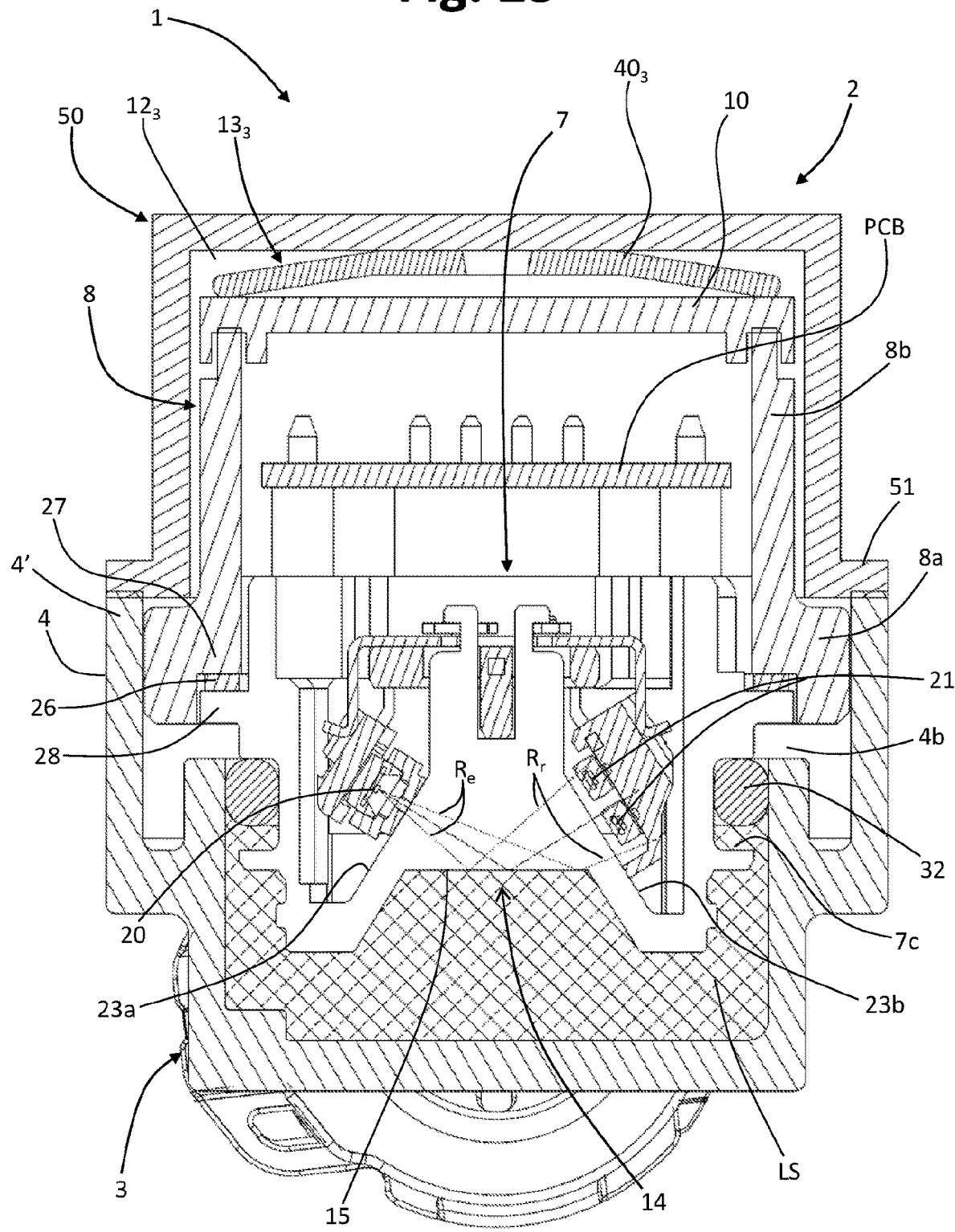

An embodiment of this type is illustrated schematically in FIGS. 22 and 23. The device 1 of FIG. 22 has a structure largely similar to that of the embodiments described previously. A first difference is represented by the fact that the sensor body 7 is coupled in a guided way with respect to the hydraulic body 3; namely, it can be displaced in a controlled way with respect to the latter. For this purpose, between the two bodies in question there may be provided suitable guide means, which enable axial sliding of one body relative to the other, for example in a substantially telescopic way. In the example, the sensor body 7 functions as guided body, whereas the hydraulic body 3 functions as guide body, and for this purpose has a portion 4 that develops more in height.

More in particular, with reference to FIG. 22, the peripheral wall 4' that laterally delimits the cup-shaped portion 4 is higher than the one illustrated previously so as to be able to gird the lower portion 8a of the casing body 8, with the latter that—unlike in the case of the previous embodiments—is not fixed to the hydraulic body 3.

Given that, as has been explained previously, the sensor body 7 is preferably fixed to the casing body 8, it will be understood that an axial displacement of the body 8 relative to the body 3 causes a consequent axial displacement of the sensor body 7 with respect to the body 3, and vice versa.

To enable such a displacement it is preferable for the body of the device 1 to envisage a further outer body part, for example hollow or in any case shaped so as to house and/or co-operate with a compensation element, such as the body part designated by 50, and hereinafter also defined as "outer body". In the example, the outer body 50 has a top wall 51 and a respective peripheral wall 52, which is preferably cylindrical and surrounds the upper portion 8b of the casing body 8. The outer body 50 is fixed to the hydraulic body 3; in the example, the wall 52 of the outer body 50 has a projection or flange 52a, which is fixed to the top of the peripheral wall 4' of the cup-shaped portion 4 of the body 3.

In this example, the compensation element belonging to the protection arrangement is represented by an elastic element that is set between the bodies 50 and 8 and is mounted so as to push the body 8 and the associated body 7 towards the inside of the body 3 (or at least keep them there), in particular with the lower end of the portion 8a of the body 8 bearing upon the upper end of the wall 4b of the body 3. In the specific case illustrated, the compensation element is represented by a spring $13_3$, having a body $40_3$ preferably made of metal material. In preferred embodiments, such as the one exemplified, the spring $13_3$ is a Belleville spring, even though it may also be a spring of some other type designed for the purpose, such as a leaf spring, or a wave spring, or a helical spring. In the example, the Belleville spring $13_3$ is set between the top wall 51 of the body 50 and the upper lid 10 of the casing body 8, preferably in a condition of at least slight pre-loading, but evidently the spring could be positioned differently, or replaced by a plurality of springs or other elastic elements. The housing space between the wall 51 and the lid 10 can be shaped at least in part to define a positioning seat $12_3$ for the spring $13_3$.

The arrangement is such that the action of the compensation element represented by the spring $13_3$ has the effect of keeping the sensor body 7 in a first axial operating position.

Operation of the device 1, as regards the modalities of optical detection, is similar to what has already been described previously.

FIG. 22 illustrates the case where the substance LS is in the liquid state, whereas FIG. 23 illustrates the case of freezing of the substance LS, and hence its consequent increase in volume. Also in this case, the increase in volume of the substance LS has been deliberately exaggerated in order to enable a clearer understanding of the working principle of the protection arrangement.

As may be noted from FIG. 23, the increase in volume of the substance LS has the effect of pushing the sensor body 7, and hence the casing body 8 associated thereto, upwards, overcoming the force of elastic reaction of the compensation element constituted by the spring $13_3$. The spring $13_3$ has a pre-defined force of reaction for this purpose, in particular a pre-defined force of reaction so as not to allow itself to undergo compression during the conditions of normal operation of the device 1, and instead allow itself to undergo compression in anomalous conditions, such as freezing of the liquid, for which entry into action of the compensation system is envisaged.

The body 8 can thus slide upwards with respect to the stationary body parts, i.e., both with respect to the body 3 (in a substantially telescopic way with respect to the cup-shaped portion 4) and with respect to the outer body 50, with the Belleville spring $13_3$ that progressively flattens out. Of course, suitable guide means may be provided between the bodies 3 and 8, and/or between the bodies 3 and 7, and/or between the bodies 8 and 50, for guiding the necessary relative axial displacements precisely and at the same time preventing angular or rotational movements.

It will be appreciated that, thanks to the displacement of the sensor body 7 in the second axial position exemplified in FIG. 23, the detection portion 14 and/or the interface wall 7a is not mechanically stressed by the increase in volume of the substance LS, thereby safeguarding its geometrical integrity, as in the other embodiments exemplified previously. It will likewise be appreciated that, in the course of unfreezing of the substance LS, i.e., as the thrust due to the ice decreases and/or ceases, the spring $13_3$ will tend to re-assume elastically its initial configuration, thereby causing return of the bodies 7-8 into their respective initial positions illustrated in FIG. 22.

It should be noted that, as an alternative to the movement described of a sensor body 7 with respect to a stationary hydraulic body 3, the structure of the device could be conceived for enabling reversed displacements, namely, with the possibility of movement of a hydraulic body with respect to the stationary sensor body.

Figure 24:
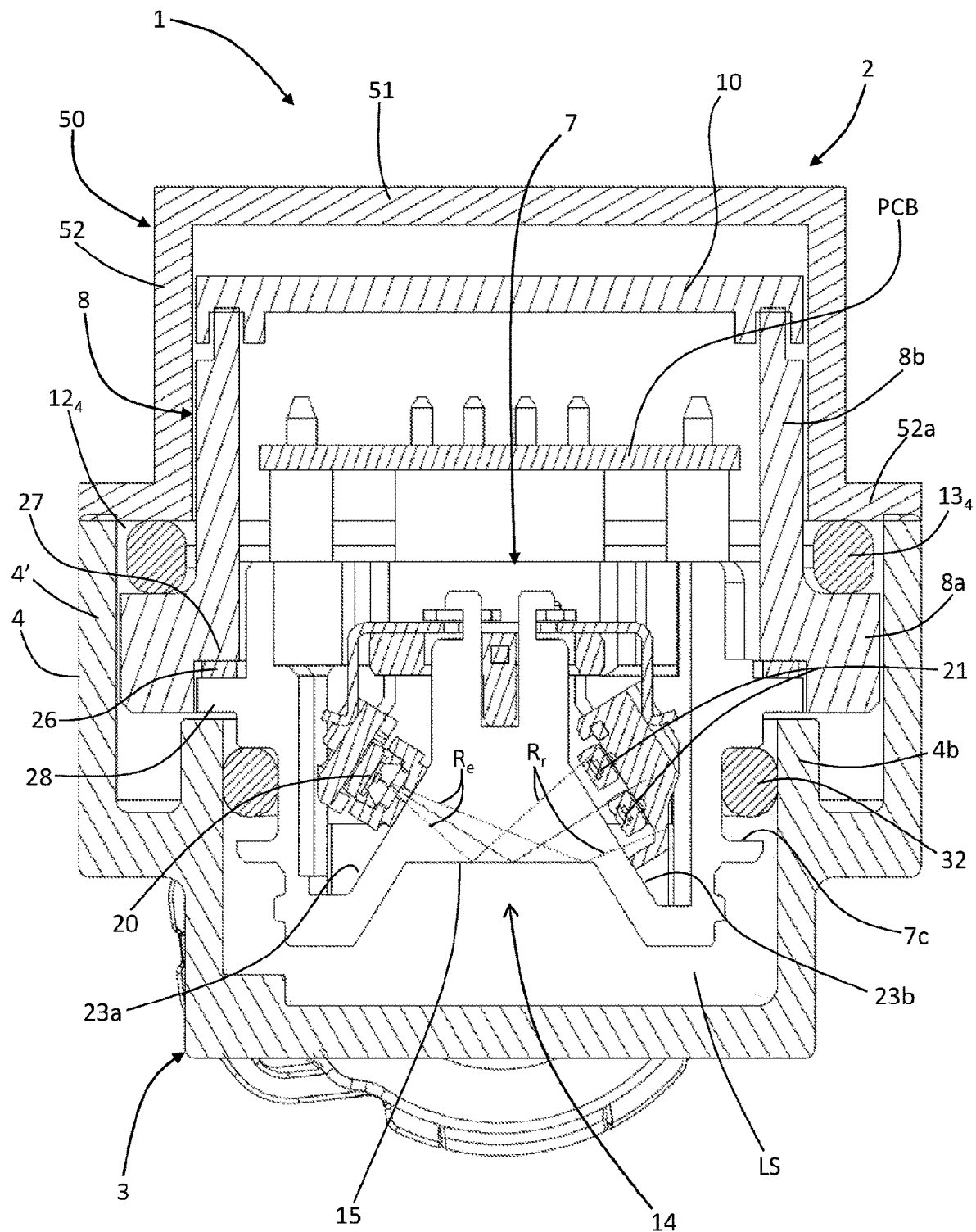
FIGS. 24 and 25 are schematic cross-sectional views of a sensor device according to further possible embodiments of the invention, in two different conditions of use.
Figure 25:
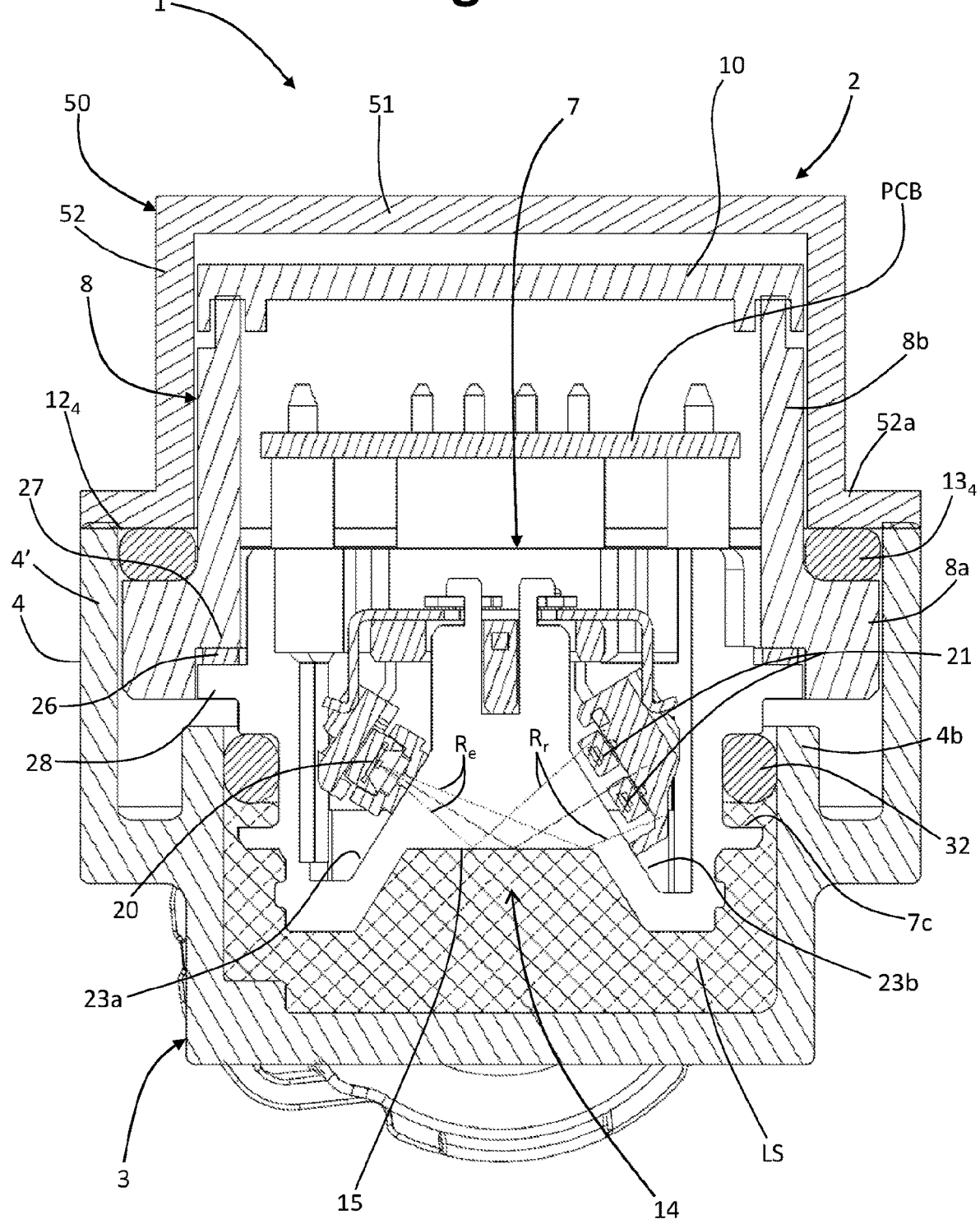

FIGS. 24 and 25 illustrate a further possible embodiment, in which e operation of the protection arrangement of the device 1 is essentially based upon the same principle set forth in relation to the embodiments described with reference to FIGS. 22 and 23, i.e., based upon the possibility of controlled displacement of the body part bearing the detection portion 14 against the action of a compensation element deformable in an elastic way.

Also in this example, the compensation element belonging to the protection arrangement is represented by an elastic element that is set between the bodies 50 and 8 and is mounted so as to push the body 8, and the associated body 7, into the hydraulic body 3 or keep them there, in particular with the lower end of the lower portion 8a of the body 8 bearing upon the upper end of the wall 4b of the body 3.

What changes, as compared to the case of FIGS. 22-23, is the type of compensation element, here represented by an elastic annular element, and its position between the bodies 8 and 50. The aforementioned elastic annular element can operate also as gasket: it will hence be appreciated that, in various embodiments, at least one compensation element can be constituted by a sealing element or the like.

In the case exemplified in FIG. 24, the compensation element is hence an elastic annular element, designated by $13_4$, for example of an O-ring type, preferably made of an elastomer material or an elastic polymer, which could also behave like a gasket and also ensure fluid tightness. This annular element $13_4$ may be altogether similar to the sealing element designated by 32: however, whereas the element 32 is basically designed to ensure fluid tightness in a radial direction between the bodies 3 and 7, the annular element $13_4$ does not necessarily have to perform sealing functions and is designed to be elastically compressed in the axial direction, in particular for the purposes of compensation according to the invention.

With reference to the example illustrated, the annular element $13_4$ is set on the outside of the casing body 8, in particular at a corresponding seat $12_4$ (here provided by the step formed between the portions 8a and 8b of the body 8 itself), and so as to be in contact above with the flange 52a of the peripheral wall 52 of the outer body 50. As may be noted, in the condition where the annular element $13_4$ is not compressed in the axial direction, it pushes the body 8 and the associated body 7 towards the inside of the hydraulic body 3 or keeps them there, in a first operating position similar to the one already described in relation to FIG. 21.

FIG. 25 illustrates schematically the case of freezing of the substance LS, and thus its consequent increase in volume. As may be noted, also in this case, the increase in volume of the substance LS has the effect of pushing the sensor body 7, and hence the casing body 8 associated thereto, upwards, overcoming the force of elastic reaction of the annular element $13_4$. The body 8 can hence slide upwards both with respect to the body 3 and with respect to the outer body 50, with the annular element $13_4$ that is progressively compressed in the axial direction and expands in a radial direction. Also in this case, it is possible to provide suitable means between the bodies 3 and 8, and/or between the bodies 3 and 7, and/or between the bodies 8 and 50, for guiding the necessary relative axial displacements and at the same time preventing their angular or rotational movements.

Thanks to the displacement of the sensor body 7 in the second axial position exemplified in FIG. 25, the detection portion 14 and/or the interface wall 7a do/does undergo any mechanical stress, thereby safeguarding their/its geometrical integrity, as in the other embodiments exemplified previously. It will also be appreciated that, in the course of unfreezing of the substance LS, the gasket $13_4$ will tend to assume again in an elastic way its axially expanded initial configuration, thereby causing return of the bodies 7-8 into their respective initial positions illustrated in FIG. 24.

It will likewise be appreciated that, in embodiments of the type illustrated in FIGS. 24-25, the compensation element does not necessarily have to be constituted by an elastic annular element, given that it can instead be replaced by a plurality of axially deformable elastic elements, for example set at a distance from one another along the perimeter or the circumference of the body part 8.

In this perspective, for example, at the step defined between the portions 8a and 8b of the body 8, there could be provided seats that house inside them the lower end of respective helical springs or other resilient elements (for example rubber pads), the lower surface of the flange 52a bearing, instead, upon the lower ends of said springs or other resilient elements.

The elastic annular element $13_4$ could also be replaced by an annular body or a plurality of elastic elements made of elastomer material co-moulded with, or overmoulded on, at least one of the bodies 50 and 8. Likewise, an annular body made of elastomer material, for example in the form of a membrane, could be overmoulded on at least one of the bodies 3 and 8, or else between both of the bodies 3 and 8, for example as a replacement for the element $13_4$, thereby rendering the presence of the outer body 50 not strictly necessary.

As has been said, at least one compensation element of the protection arrangement of the sensor device according to the invention may be constituted by an elastic element, also in the form of a sealing element or the like. In this perspective, one and the same element used for guaranteeing the hydraulic seal between different parts of the body of the device could function as compensation element.

Figure 26:
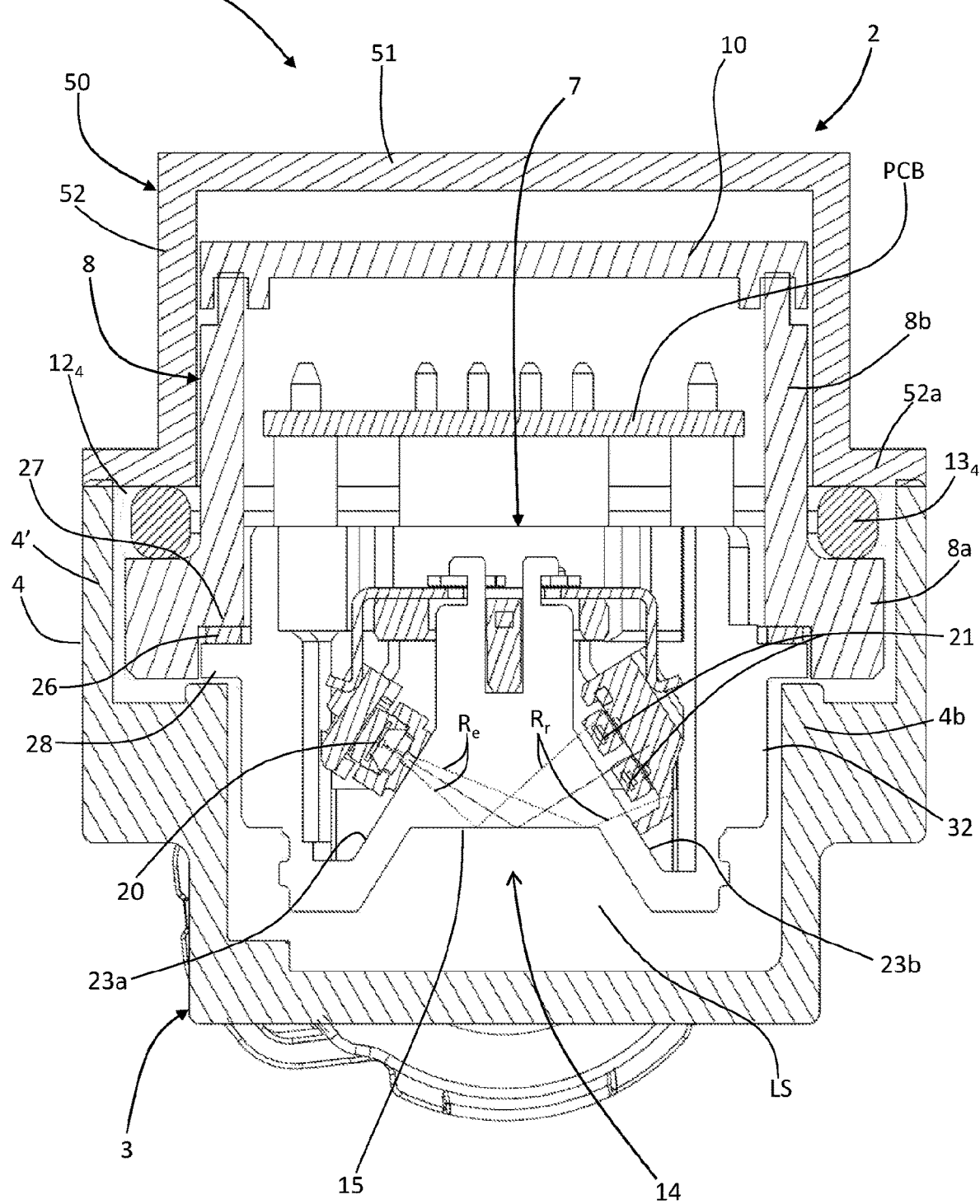
FIGS. 26 and 27 are schematic cross-sectional views of a sensor device according to further possible embodiments of the invention, in two different conditions of use.
Figure 27:
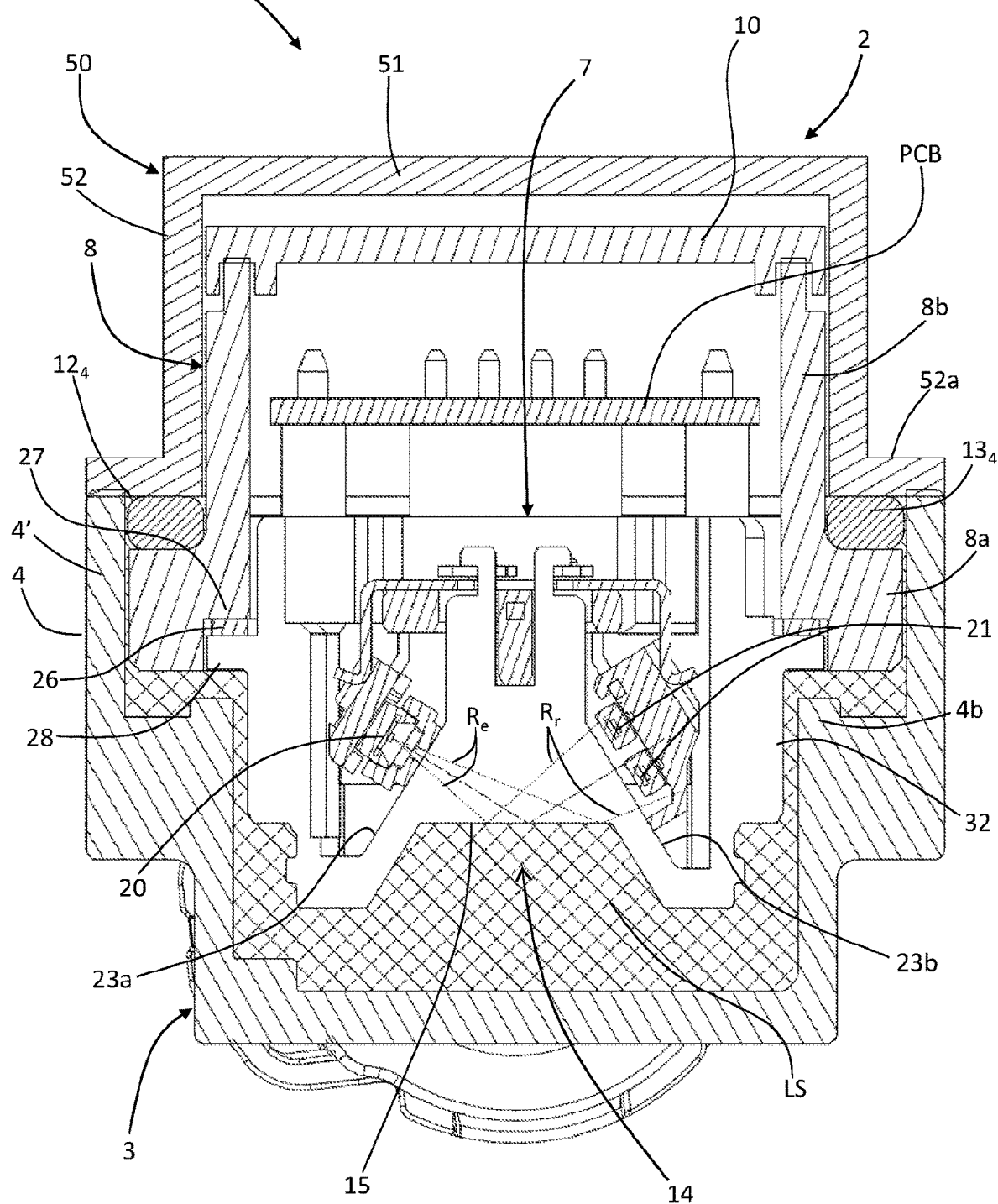

For instance, FIGS. 26-27 illustrate an embodiment in which an element $13_4$ of the type described with reference to FIGS. 24-25 is used both as sealing element between the bodies 8 and 50 and as compensation element, and the sealing element 32 of the previous embodiments is omitted. In an application of this type, and unlike the sealing element 32, the element $13_4$ is prearranged to provide also a seal prevalently of an axial type between the bodies 8 and 50.

FIG. 26 illustrates a condition similar to the one illustrated in FIG. 24 with the difference that, in this case, since the sealing element 32 is not provided, the substance in the liquid state LS can penetrate into the gaps existing between the bodies 3, 7, 8 and 50, as far as the seat $12_4$ of the gasket $13_4$, the action of axial seal of which prevents passage of the substance LS towards the upper portion 8b of the body 8, namely towards the inside of the body 50. It should be noted that the substance LS cannot even penetrate into the bodies 7 and 8, given the action of sealing exerted between said bodies by the gasket 26.

FIG. 27 illustrates, instead, the case of freezing of the liquid substance LS, and hence its consequent increase in volume. As in the case of FIG. 25, the increase in volume of the substance LS has the effect of pushing the other sensor body 7, and hence the casing body 8 associated thereto, upwards, overcoming the force of elastic reaction of the compensation and sealing element $13_4$. The body 8 can hence slide upwards both with respect to the body 4 and with respect to the outer body 50, with the gasket $13_4$ that undergoes progressive compression in the axial direction, and at the same time expands in a radial direction, ensuring the necessary seal between the bodies 3, 8, and 50. Also in this case, there may of course be provided suitable means between the bodies 3 and 8, and/or between the bodies 3 and 7, and/or between the bodies 8 and 50, for guiding the necessary relative axial displacements and at the same time preventing angular or rotational movements thereof.

As for the embodiments described previously, thanks to the displacement of the sensor body 7 in the second axial position exemplified in FIG. 27, the detection portion 14 does not undergo mechanical stress and, in the course of unfreezing of the substance LS, the compensation and sealing element 13₄ will tend to re-assume in an elastic way its initial configuration expanded in the axial direction, thereby causing return of the bodies 7-8 into the respective initial positions illustrated in FIG. 26.

Also in this case, the compensation and sealing element 13₄ could possibly be replaced by an annular body made of elastomer material co-moulded or overmoulded between the bodies 50 and 8, or between the bodies 3 and 8 (in the latter case, the presence of the outer body 50 might not be necessary).

It should once more be pointed out, with reference to the embodiments of FIGS. 24-25 and 26-27, that the flange 52a of the outer body 50 could be replaced by a functionally similar part defined directly by the hydraulic body 3, for example at an upper region of its peripheral wall 4'. Hence, in this perspective, the compensation and sealing element 13₄ could also be understood as co-operating between the body 8 and the body 3.

In even more general terms, a gasket or similar element having the same function as the one designated previously by 13₄ (even of an overmoulded type, as already mentioned) may be provided for operating as compensation element, or as compensation and sealing element, between a stationary body part (such as the body 3 and/or the body 50) and a movable body part (such as the body 7 and/or the body 8). It will be appreciated, for example, that a gasket or a compensation element performing the functions of the element 13₄ of FIGS. 26-27 could be functionally set between the bodies 3 and 7, with simple geometrical modifications of the latter.

It should once more be pointed out that the outer body 50, if envisaged, does not necessarily have to have a box-like structure, given that it can be replaced, in the case of the embodiments of FIGS. 24-25 and 26-27, by a ring nut or similar annular element, which can be fixed on the hydraulic body 3, for example having a respective portion that girds on the outside an upper region of the wall 4'; in such a case, for example, fixing between the two bodies in question could be of a threaded type, or with a bayonet coupling.

The gaskets or sealing elements 32 and/or 13₄ will preferably have a substantially elliptical cross section, even though not ruled out from the scope of the invention is a substantially circular or substantially square cross section thereof.

It is clear that numerous variations may be made by the person skilled in the branch to the optical sensor device described herein by way of example, without thereby departing from the scope of the invention. It is likewise evident to the person skilled in the art that individual characteristics described in relation to one embodiment may be used in other embodiments described herein, even different from the ones described in the previous examples.

The optical sensor device described forming the subject of the invention can, with evident structural modifications—for example, linked to the pre-defined critical angle and/or the type of its optical arrangement—be used for detecting characteristics of a fuel and/or for distinguishing mixtures of fuels, such as petrol-ethanol mixtures or diesel-biodiesel mixtures, or else for detecting possible contamination of a fuel or of a generic liquid. Moreover, as has already been mentioned, a sensor device according to the invention can find application also in apparatuses other than motor vehicles.

The invention has been described with particular reference to a device used for detecting characteristics of a liquid substance that flows in a generic duct, but, as has been said, the principles underlying the invention can be used for providing optical sensor devices that can be applied to containers of liquid substances, such as tanks. Likewise, the invention may be applied also in the case of optical sensors that base their operation on principles other than the variation of the angle of reflection or that have purposes different from detection of quality or concentration.

It should also be pointed out that to the detection portion of the device there does not necessarily have to be associated both the emitter and the receiver of the optical radiation. For instance, in possible variant embodiments, the device may include two spatially distinct detection portions, between which is of flows the substance undergoing detection, there being associated to one portion the at least one emitter and to the other portion the at least one receiver. The invention may hence also refer only to some parts of a device of the type described, such as an optical sensor comprising at least one body part transparent to optical radiation and at least one of an optical emitter and an optical receiver, associated to at least one compensation element.

The compensation element, or at least one compensation element, of a device according to the invention could also be constituted by a thinned-out portion of a body part thereof (e.g., a part for connection between the bodies 7 and 8), or in any case could be prearranged to operate like an elastic element in order to enable operation of the protection arrangement in the way described with reference to FIG. 22-23, 24-25, or 26-27, i.e., so as to enable a reversible displacement of the body part bearing the optical arrangement 14.

In the versions of device with a movable sensor body, the compensation element could include a spring or similar elastic element that undergoes extension under the thrust of the substance that increases in volume or pressure, and hence pulls the sensor body towards its initial position, when the substance unfreezes or returns to the normal operating pressure (i.e., a spring that works in a way opposite to those exemplified).

The principles underlying the invention may be also applied to the case of fluid substances other than liquids (e.g., gases), which are subject to increase in volume in the case of freezing and/or in the case of pressure jumps. As has been mentioned, the protection arrangement described can also be used for preventing possible increases in volume of the substance within the more exquisitely hydraulic part of the device due to over-pressures.

The invention claimed is:

1. An optical sensor device for detecting at least one characteristic of a fluid substance, the optical sensor device comprising a device body having a fluid-tight space for containment or flow of the fluid substance,
   wherein the device body has a first body part and a second body part coupled to each other in a fixed position and in a fluid-tight way, in a stationary position relative to each other, to delimit therebetween at least one part of the fluid-tight space,
   wherein the second body part has a detection portion, mounted at which is a sensitive optical part configured for detecting the at least one characteristic of the fluid substance, the sensitive optical part comprising at least one of an emitter and a receiver of an optical radiation, wherein the detection portion is made of a material transparent to the optical radiation and has an inner surface and an outer surface, the outer surface being in contact with the fluid substance and the inner surface being isolated from the fluid substance, wherein the at least one of the emitter and the receiver of the sensitive optical part is optically coupled to the inner surface of the detection portion, in such a way that the optical radiation is at least in part propagated through the detection portion, wherein the optical sensor device comprises a protection arrangement, configured for preventing possible deformations of the detection portion or of the device body caused by an increase in volume or pressure of the fluid substance, wherein the protection arrangement comprises at least one compensation element having a body that is elastically deformable or compressible, and is configured for compensating thereby a possible increase in volume or pressure of the fluid substance, wherein the body of the at least one compensation element is permanently mounted inside the fluid-tight space, in a mounting position which is fixed relative to the first body part and the second body part, in such a way that the body of the at least one compensation element is deformed or compressed by the fluid substance which is being contained or flowing into the fluid-tight space upon occurrence of an increase in volume or pressure of the fluid substance, and wherein the first body part forms a bottom of the fluid-tight space, which is opposite to the outer surface of the detection portion, with the body of the at least one compensation element which rests on said bottom, in such a way that, upon occurrence of an increase in volume or pressure of the fluid substance, the body of the at least one compensation element undergoes a compression towards said bottom.

2. The optical sensor device according to claim 1, wherein the at least one compensation element comprises at least two compensation elements, each having one said elastically deformable or compressible body.

3. The optical sensor device according to claim 1, wherein the body of the at least one compensation element comprises at least one coupling or positioning seat for a corresponding coupling or positioning part of the detection portion or of the device body.

4. The optical sensor device according to claim 1, wherein the first body part of the device body comprises a positioning seat for the body of the at least one compensation element, the positioning seat being located within the fluid-tight in a position opposite to the outer surface of the detection portion.

5. The optical sensor device according to claim 1, wherein the first body part and the second body part are configured as separate parts coupled together with interposition of at least one first sealing element, the first sealing element being in a position spaced apart from the body of the at least one compensation element.

6. The optical sensor device according to claim 1, wherein the device body comprises at least one third body part, configured as a part separate from the first body part and the second body part, the third body part being coupled to the second body part with interposition of at least one respective elastic element, the elastic element being in a position spaced apart from the body of the at least one compensation element.

7. The optical sensor device according to claim 1, wherein the elastically deformable or compressible body of the at least one compensation element is shaped for bringing about a reduction of a section of passage for the fluid substance within the fluid-tight space.

8. The optical sensor device according to claim 6, wherein the sensitive optical part belongs to a detection arrangement of the optical sensor device, and the third body part forms at least part of a housing for one or more components of the detection arrangement other than said sensitive optical part.

9. An optical sensor device for detecting at least one characteristic of a fluid substance, the optical sensor device comprising a device body having a fluid-tight space for containment or flow of the fluid substance, wherein the device body has a detection portion, mounted at which is a sensitive optical part configured for detecting the at least one characteristic of the fluid substance, the sensitive optical part comprising an emitter and a receiver of an optical radiation, wherein the detection portion comprises an interface wall which is made of a material transparent to the optical radiation and has at least one outer surface in contact with the fluid substance contained or flowing in the fluid-tight space, to form therewith a reflection interface, wherein the emitter and the receiver of the sensitive optical part are optically coupled to an inner surface of the detection portion, wherein the interface wall is shaped to contribute to propagation of the optical radiation by reflection at the reflection interface, from the emitter to the receiver, the optical radiation from the emitter being at least in part propagated through the interface wall as far as the reflection interface, to be reflected by the reflection interface and further propagated through the interface wall towards the receiver, such that the optical radiation is reflected at least in part by the reflection interface with an angle that is variable as a function of the at least one characteristic of the fluid substance, wherein the optical sensor comprises an arrangement for protection of the at least one detection portion and/or of at least one part of the device body, the protection arrangement comprising at least one elastically deformable or compressible compensation element configured for preventing damage to the device deriving from possible increases in volume or pressure of the fluid substance, wherein the device body has a first body part and a second body part coupled to each other in a fixed position and in a fluid-tight way, in a stationary position relative to each other, to delimit therebetween at least one part of the fluid-tight space, and wherein the at least one elastically deformable or compressible compensation element is permanently mounted inside the fluid-tight space, in a mounting position which is fixed relative to the first body part and the second body part, in such a way that the body of the at least one compensation element is deformed or compressed by the fluid substance which is being contained or flowing into the fluid-tight space upon occurrence of an increase in volume or pressure of the fluid substance, and wherein, upon occurrence of an increase in volume or pressure of the fluid substance, the at least one elastically deformable or compressible compensation element undergoes a compression in a direction opposite to the interface wall.

10. An optical sensor device for detecting at least one characteristic of a fluid substance, the optical sensor device comprising a device body having a fluid-tight space for containment or flow of the fluid substance, and a detection portion, mounted at which is a sensitive optical part configured for detecting the at least one characteristic of the fluid substance, the sensitive optical part comprising at least one of an emitter and a receiver of an optical radiation,
- wherein the device body has a first body part and a second body part coupled to each other in a fixed position and in a fluid-tight way, in a stationary position relative to each other, to delimit therebetween at least one part of the fluid-tight space,
- wherein the detection portion comprises an interface wall which is made of a material transparent to the optical radiation, and has at least one outer surface in contact with the fluid substance,
- wherein the optical sensor device comprises a protection arrangement including at least one elastically deformable or compressible compensation body, configured for preventing possible damage, or deformation, or failure of the at least one detection portion caused by an increase in volume or pressure of the fluid substance, and wherein the at least one elastically deformable or compressible compensation body is permanently mounted inside the fluid-tight space, in a mounting position which is fixed relative to the first body part and the second body part, in such a way that the at least one elastically deformable or compressible compensation body is deformed or compressed by the fluid substance which is being contained or flowing into the fluid-tight space, upon occurrence of an increase in volume or pressure of the fluid substance;
- wherein the interface wall is made of a material selected from cyclo-olefin copolymers or a polysulphone or a polypropylene or a high-density polyethylene or a glass or silica or a material containing silicon;
- wherein the elastically deformable or compressible compensation body comprises an elastomer material or an elastic and/or compressible polymer, having:
  - a bulk modulus comprised between 0.1 MPa and 1 Gpa, and/or
  - a hardness of between 5 Shore A and 100 Shore A; and/or
  - a silicone material or a silicone elastomer or a liquid silicone rubber or fluoro liquid silicone rubber; and/or
  - a polymer co-moulded with, or overmoulded on, at least one part of the device body
- and wherein the first body part forms a bottom of the fluid-tight space, which is opposite to the outer surface of the detection portion, with the at least one elastically deformable or compressible compensation body resting on said bottom, in such a way that the elastically deformable or compressible compensation body undergoes compression towards said bottom upon occurrence of an increase in volume or pressure of the fluid substance.

11. An optical sensor device for detecting at least one characteristic of a fluid substance, the optical sensor device comprising a device body having a fluid-tight space for containment or flow of the fluid substance,
- wherein the device body has a first body part and a second body part coupled to each other in a fixed position and in a fluid-tight way, in a stationary position relative to each other, to delimit therebetween at least one part of the fluid-tight space,
- wherein the second body part has a detection portion, mounted at which is a sensitive optical part configured for detecting the at least one characteristic of the fluid substance, the sensitive optical part comprising at least one of an emitter and a receiver of an optical radiation,
- wherein the detection portion is made of a material transparent to the optical radiation and has an inner surface and an outer surface, the outer surface being in contact with the fluid substance and the inner surface being isolated from the fluid substance,
- wherein the at least one of the emitter and the receiver of the sensitive optical part is optically coupled to the inner surface of the detection portion, in such a way that the optical radiation is at least in part propagated through the detection portion,
- wherein the optical sensor device comprises a protection arrangement, configured for preventing possible deformations of the detection portion or of the device body caused by an increase in volume or pressure of the fluid substance,
- wherein the protection arrangement comprises at least one compensation element having a body that is elastically deformable or compressible, and is configured for compensating thereby a possible increase in volume or pressure of the fluid substance,
- wherein the body of the at least one compensation element is permanently mounted inside the fluid-tight space, in a mounting position which is fixed relative to the first body part and the second body part, in such a way that the body of the at least one compensation element is deformed or compressed by the fluid substance which is being contained or flowing into the fluid-tight space upon occurrence of an increase in volume or pressure of the fluid substance, and
- wherein the body of the at least one compensation element has a cavity for passage of the fluid substance.

12. The optical sensor device according to claim 11, wherein the at least one compensation element is mounted inside the fluid-tight space with said cavity facing the detection portion.

* * * * *